United States Patent
Yan et al.

(10) Patent No.: US 10,078,765 B2
(45) Date of Patent: Sep. 18, 2018

(54) METHOD AND DEVICE FOR PROCESSING STOLEN TERMINAL

(71) Applicant: BEIJING QIHOO TECHNOLOGY COMPANY LIMITED, Beijing (CN)

(72) Inventors: Xuesong Yan, Beijing (CN); Yunyu Tan, Beijing (CN); Zheng Huang, Beijing (CN); Yanbei Jiang, Beijing (CN); Guofeng Fan, Beijing (CN); Bin Li, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 69 days.

(21) Appl. No.: 15/103,396

(22) PCT Filed: Dec. 11, 2014

(86) PCT No.: PCT/CN2014/093637
§ 371 (c)(1),
(2) Date: Jun. 10, 2016

(87) PCT Pub. No.: WO2015/085941
PCT Pub. Date: Jun. 18, 2015

(65) Prior Publication Data
US 2016/0314323 A1 Oct. 27, 2016

(30) Foreign Application Priority Data

Dec. 13, 2013 (CN) .......................... 2013 1 0685113
Dec. 13, 2013 (CN) .......................... 2013 1 0685287
Dec. 13, 2013 (CN) .......................... 2013 1 0687600

(51) Int. Cl.
*G06F 7/04* (2006.01)
*G06F 21/88* (2013.01)
(Continued)

(52) U.S. Cl.
CPC .............. *G06F 21/88* (2013.01); *G06F 21/31* (2013.01); *G06F 21/554* (2013.01); *H04W 8/22* (2013.01);
(Continued)

(58) Field of Classification Search
None
See application file for complete search history.

(56) References Cited

U.S. PATENT DOCUMENTS

2004/0006655 A1* 1/2004 Toffolet ................ H04M 1/673
710/1
2005/0096094 A1 5/2005 Kim et al.
(Continued)

FOREIGN PATENT DOCUMENTS

CN 1960553 A 5/2007
CN 102780989 A 11/2012
(Continued)

OTHER PUBLICATIONS

International Search Report of the International Searching Authority for Application No. PCT/CN2014/093637, dated Mar. 3, 2015.

*Primary Examiner* — Brandon S Hoffman
(74) *Attorney, Agent, or Firm* — Alston & Bird LLP

(57) ABSTRACT

The invention provides multiple methods and devices for processing a stolen terminal. Therein, a method for processing a stolen terminal comprises: receiving a state modification message from a sending party, wherein the state modification message carries the current state of the terminal; and in a case where the state modification message is legal, forwarding the state modification message to a server, so that the server modifies the state information of the terminal stored in the server to be the current state according to the state modification message. By employing embodiments of the invention, the state information of a terminal can be modified, which solves the problem in the prior art that other (Continued)

identification cannot be provided to indicate whether the terminal is stolen or not, and can achieve the beneficial effects of increasing the probability of recovering a stolen terminal and effectively curbing the stealing acts.

18 Claims, 10 Drawing Sheets

(51) Int. Cl.
| | |
|---|---|
| *H04W 8/22* | (2009.01) |
| *G06F 21/31* | (2013.01) |
| *G06F 21/55* | (2013.01) |
| *H04W 12/12* | (2009.01) |
| *H04M 1/67* | (2006.01) |
| *H04W 4/50* | (2018.01) |

(52) U.S. Cl.
CPC ..... *H04W 12/12* (2013.01); *G06F 2221/2117* (2013.01); *H04M 1/67* (2013.01); *H04W 4/50* (2018.02)

(56) References Cited

U.S. PATENT DOCUMENTS

| | | | |
|---|---|---|---|
| 2009/0183266 A1* | 7/2009 | Tan | G06F 21/88 726/35 |
| 2010/0219979 A1* | 9/2010 | Ordogh | H04W 4/02 340/539.32 |
| 2012/0159617 A1* | 6/2012 | Wu | G06F 21/445 726/19 |
| 2014/0094141 A1* | 4/2014 | Wan | H04W 12/02 455/410 |

FOREIGN PATENT DOCUMENTS

| | | |
|---|---|---|
| CN | 102833712 A | 12/2012 |
| CN | 102843405 A | 12/2012 |
| CN | 103347131 A | 10/2013 |
| CN | 103699821 A | 4/2014 |
| CN | 103702314 A | 4/2014 |
| CN | 103702315 A | 4/2014 |
| EP | 2615807 A1 | 7/2013 |

* cited by examiner

METHOD AND DEVICE FOR PROCESSING STOLEN TERMINAL

FIELD OF THE INVENTION

The invention relates to the field of internet applications, and in particular, to a method and device for processing a stolen terminal.

BACKGROUND OF THE INVENTION

With the rapid development of intelligent terminals and networks, terminals (comprising a variety of devices such as computers, mobile phones, tablets, etc.) play a more and more important role in people's lives, and increasingly become an indispensable all-around "assistant" in people's work and lives. For ease of use, when using an application of a terminal, a person will generally store information such as various account information, private chat records and pictures/photos, etc. directly in the terminal. Therefore, if the terminal were lost, not only property loss would be brought about to the user, but what is more important is that, for the private information stored in the terminal by the user, for example, financial information such as an account password, etc., if the private information were leaked, it would be difficult to estimate the loss caused to the user. Hence, anti-theft for a terminal is very important.

In the prior art, after a terminal is lost, the loser can only indicate that the terminal is stolen by means of calling the police, but cannot provide other identification to indicate that the terminal is stolen. However, by indicating that the terminal is stolen by means of calling the police, only a small range of people such as the loser and the police can know that the terminal is stolen. For most people, especially when the theft conducts a transaction on the stolen terminal, the person who buys the stolen terminal cannot recognize whether the terminal has been stolen. Such a technical defect results in that a user easily buys a stolen terminal, which further promotes an adverse consequence that wrongful acts of stealing terminals take place.

SUMMARY OF THE INVENTION

In view of the above problems, the invention is proposed to provide a method for processing a stolen terminal and a corresponding device, which overcome the above problems or at least in part solve the above problems.

According to an aspect of the invention, there is provided a method for processing a stolen terminal, comprising: receiving a state modification message from a sending party, wherein the state modification message carries the current state of the terminal; and in a case where the state modification message is legal, forwarding the state modification message to a server, so that the server modifies the state information of the terminal stored in the server to be the current state according to the state modification message.

The invention further provides a client for processing a stolen terminal, comprising: a receiver configured to receive a state modification message from a sending party, wherein the state modification message carries the current state of the terminal; a legality judger configured to judge whether the state modification message is legal; and a sender configured to, in a case where the state modification message is legal, forward the state modification message to a server, so that the server modifies the state information of the terminal stored in the server to be the current state according to the state modification message.

The invention further provides a server, comprising: a command receiver configured to receive a state modification message sent by a terminal, wherein the state modification message carries the current state of the terminal and the identity identification information of the terminal; and a state modifier configured to modify the state information of the terminal stored in the server to be the current state according to the state modification message.

According to the embodiment of the invention, after receiving a state modification message from a sending party, legality verification is performed on the state modification message to guarantee that the received state modification message is an authentic, valid and credible command, and avoid that the state information of a terminal is maliciously modified due to reception of a state modification instruction sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. In a case where the state modification message is legal, the method provided by the embodiment of the invention forwards the state modification message to the server, so that the server modifies the state information of the terminal stored in the server to be the current state according to the state modification message, which solves the problem in the prior art that other identification can not be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

According to another aspect of the invention, there is provided another method for processing a stolen terminal, comprising: receiving a state modification message from a sending party, wherein the state modification message carries identity identification information of a terminal of which the state has been changed; forwarding the state modification message to a terminal corresponding to the identity identification information of the terminal for verification by the terminal; and modifying the state information of the terminal according to a state modification request returned when the terminal verifies that the state modification message passes.

The invention further provides a server, comprising: a receiver configured to receive a state modification message from a sending party, wherein the state modification message carries identity identification information of a terminal of which the state has been changed; a sender configured to forward the state modification message to a terminal corresponding to the identity identification information of the terminal for verification by the terminal; and a state modifier configured to modify the state information of the terminal according to a state modification request returned when the terminal verifies that the state modification message passes.

The invention further provides a client for processing a stolen terminal, comprising: a message receiver configured to receive a state modification message from a sending party and forwarded by a server; a verifier configured to verify the received state modification message; and a request sender configured to, after the state modification message passes the verification, return a state modification request to the server, so that the server modifies the state of the terminal according to the state modification request.

According to the embodiment of the invention, a state modification message from a sending party is received and forwarded to a corresponding terminal, so that the terminal verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal can not be obtained, and the theft can not be captured according to the related information of the stolen terminal. After the terminal verifies that the state modification message is legal, the embodiment of the invention receives a state modification request returned by the terminal, and modifies the state information of the terminal according to the state modification request, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

According to still another aspect of the invention, there is provided still another method for processing a stolen terminal, comprising: receiving a state modification message from a sending party, wherein the state modification message carries identity identification information of a terminal and the current state of the terminal; utilizing a server to perform legality verification on the state modification message; and modifying the state information of a terminal corresponding to the identity identification information to be the current state according to the state modification message which passes the legality verification.

The invention further provides a server, comprising: a receiver configured to receive a state modification message from a sending party, wherein the state modification message carries identity identification information of a terminal and the current state of the terminal; a judger configured to judge whether the state modification message passes legality verification; and a state modifier configured to modify the state information of a terminal corresponding to the identity identification information to be the current state according to the state modification message which passes the legality verification.

According to the embodiment of the invention, a state modification message from a sending party is received, and a server is utilized to verify the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the state modification message passes the legality verification, the embodiment of the invention modifies the state information of the terminal according to the state modification message, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

According to yet still another aspect of the invention, there is provided a computer program comprising a computer readable code which causes a computing device to perform a method for processing a stolen terminal according to the invention, when said computer readable code is running on the computing device.

According to yet still another aspect of the invention, there is provided a computer readable medium storing therein a computer program of a method for processing a stolen terminal according to the invention.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

It is mentioned in the related art that it cannot be determined whether a terminal is stolen, and therefore, after a terminal is stolen, the loser can indicate that the terminal is stolen currently only by means of calling the police, and cannot provide other identification to indicate that the terminal is stolen. Such a technical defect results in that a user easily buys a stolen terminal, so that the wrongful act of stealing a terminal can produce adverse consequences.

Embodiment One

Figure 1:
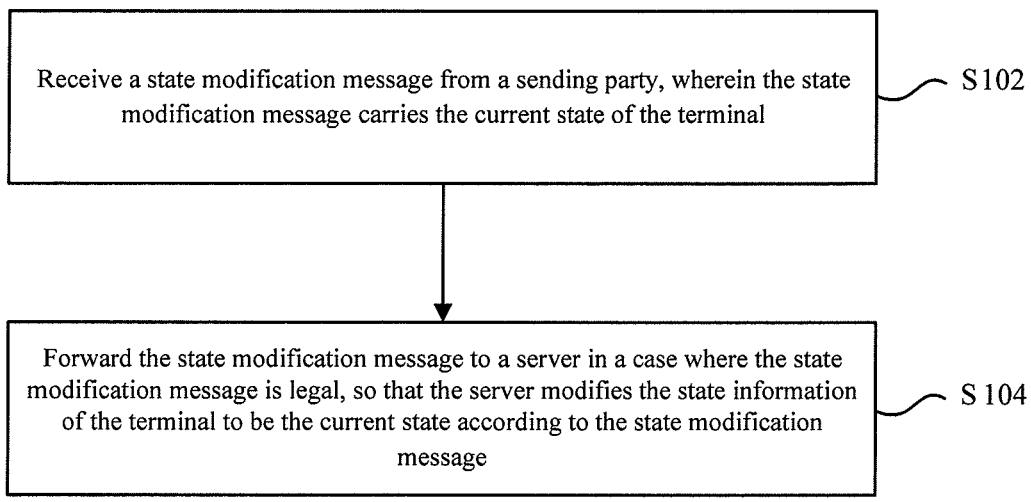
FIG. 1 shows a processing flow chart of a method for processing a stolen terminal according to an embodiment of the invention.

To solve the above technical problem, an embodiment of the invention provides a method for processing a stolen terminal. FIG. 1 shows a processing flow chart of a method for processing a stolen terminal according to an embodiment of the invention. As shown in FIG. 1, the flow comprises at least step S102 to step S104.

At the step S102, a state modification message from a sending party is received, wherein the state modification message carries the current state of the terminal.

At the step S104, in a case where the state modification message is legal, the state modification message is forwarded to a server, so that the server modifies the state information of the terminal stored in the server to be the current state according to the state modification message.

After receiving a state modification message from a sending party, the embodiment of the invention performs legality verification on the state modification message to guarantee that the received state modification message is an authentic, valid and credible command, and avoid that the state information of a terminal is maliciously modified due to reception of a state modification instruction sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. In a case where the state modification message is legal, the method provided by the embodiment of the invention forwards the state modification message to the server, so that the server modifies the state information of the terminal stored in the server to be the current state according to the state modification message, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

When the step S102 is performed, a state modification message from a sending party is received, wherein the identity of the sending party needs to be verified, and if the sending party passes the identity verification, it shows that the state modification message from the sending party is legal, and anti-theft operations may continue to be performed; and if the sending party does not pass the identity verification, it shows that the state modification message from the sending party is illegal, it is unnecessary to continue to perform anti-theft operations.

In the embodiment of the invention, the identity of a sending party may generally be designated by a number, and the sending party corresponds to the number one to one. At a stolen terminal side, to guarantee the reliability of the identity verification of a sending party, generally, a list of credible numbers is provided, in which credible numbers of the stolen terminal are stored, for example, relatives'/friends' numbers, agreed authentication codes, etc. Therefore, when legality verification is performed on the state modification message, the number representative of the sending party may be matched with a credible number stored at the stolen terminal side. If the two match each other, then the sending party passes the identity verification, and the state modification message sent out by the sending party is legal. If the two do not match each other, then the sending party does not pass the identity verification, and accordingly, the state modification message sent out by the sending party is also illegal.

Considering that a sending party needs to send different commands and it is necessary to perform identity legality verification for it, therefore, in this example, the sending party may be a terminal which can send out a command and has a unique identification, for example, a mobile terminal such as a mobile phone. Each mobile terminal has a unique telephone number available for identity legality verification, and can send out a message or instruction by multiple means such as a short message or a network, etc.

After performing legality verification on the state modification message, the embodiment of the invention performs a different operation according to the verification result. In particular, if the state modification message does not pass the legality verification, the embodiment of the invention ignores the state modification message, and if the state modification message passes the legality verification, the embodiment of the invention obtains the identity identification information of the stolen mobile terminal. In the embodiment of the invention, after the identity identification information of the terminal is obtained, the state modification message carrying the identity identification information is sent to a server.

After the server receives the state modification message carrying the identity identification information of the terminal, the embodiment of the invention utilizes the server to verify whether the state modification message is legal or not. In particular, the embodiment of the invention verifies the legality of the state modification message by judging whether the identity identification information carried in the state modification message matches identity identification information stored in the server or not. If the identity identification information carried in the state modification message matches identity identification information stored in the server, then the embodiment of the invention judges the state modification message to be legal. If the identity identification information carried in the state modification message does not match identity identification information stored in the server, then the embodiment of the invention judges the state modification message to be illegal.

It is mentioned above that the embodiment of the invention performs a next operation according to the result of judging the legality of the state modification message. When the state modification message is illegal, the embodiment of the invention ignores the state modification message. When the state modification message is legal, the embodiment of the invention triggers the operation of modifying the state information in the server. After the server is triggered, the state information of the terminal stored in the server is modified to be the current state according to the state modification message.

Preferably, in an embodiment of the invention, after the server modifies the state information of the terminal to be the current state, the server returns the modification result to the terminal, and the modification result is sent to the sending party via the terminal. In the embodiment of the invention, after the current state of the terminal is modified, the modification result is sent to the terminal, and then forwarded to the sending party by the terminal, which reminds both the terminal and the sending party respectively that the current state of the terminal has been modified, and in turn enables the terminal and the sending party to perform a corresponding operation according to the modified current state of the terminal. For example, when the terminal is a mobile phone, the user uses a relative's/friend's number bound to the stolen mobile phone to send a state modification message to the stolen mobile phone to mark the mobile phone to be stolen. After the server modifies the current state of the mobile phone to be stolen according to the state modification message, if the modification result is returned to the stolen mobile phone and the relative's/friend's number, the stolen mobile phone can determine that it itself is stolen, and then perform anti-theft operations, for example, anti-theft operations of locking the screen for the mobile phone, obtaining the fingerprints of the theft, or the like. In addition, the user can know that the mobile phone has been marked to be stolen in time, and further perform other anti-theft operations on the stolen mobile phone.

In the embodiment of the invention, the identity identification information of the terminal may be the international mobile equipment identity (IMEI for short hereinafter) of the terminal, may be the user identity (ID for short hereinafter) of the terminal, or also may be any identity identification information which can uniquely identify the terminal, which will not be defined by the embodiment of the invention. To increase the security of the terminal and determine that the state modification message received by the server is a legal state modification message verified by the terminal, preferably, the embodiment of the invention provides a terminal identity identification. The terminal identity identification is a hardware ID of the terminal.

Now, the obtaining of the hardware ID will be introduced in particular. It is mentioned above that after determining that the state modification message sent by the sending party is legal, the embodiment of the invention obtains the hardware ID. To obtain the hardware ID, the embodiment of the invention first obtains the IMEI of the terminal, which is denoted as a first character string. Second, the embodiment of the invention obtains the network card address of the stolen mobile terminal, and removes the non-letter and non-numeric characters in the network card address, wherein the network card address after the removal is denoted as a second character string. After obtaining the first character string and the second character string, the embodiment of the invention obtains the serial number of the central processing unit (CPU for short hereinafter) of the terminal, which is denoted as a third character string. After obtaining the first, the second and the third character strings, the embodiment of the invention merges the three character strings according to a predetermined order. Therein, the predetermined order may be to merge the three character strings according to the order of first, second and third, may be to merge the three character strings according to the inverted order of third, second and first, or also may be other predetermined order, which will not be defined by the embodiment of the invention.

After merging the character strings, the embodiment of the invention converts the result obtained after the merging into a capital format, which is denoted as a first result. After obtaining the first result, the embodiment of the invention continues to perform a Message Digest Algorithm 5 (MD5 for short hereinafter) calculation on the first result, to obtain a second result. Afterwards, the embodiment of the invention converts the second result into a capital format to obtain the hardware ID of the terminal.

In the embodiment of the invention, the hardware ID of the terminal is obtained by performing a merging operation on the IMEI, the network card address and the serial number of the CPU of the terminal, which can guarantee that the state modification message received by the server is authentic, valid and credible, and avoid that the server modifies the state information of the terminal erroneously due to reception of a state modification message sent from an incredible or malicious sending side which is disguised as the terminal. For example, if an incredible or malicious sending side which is disguised as the terminal sends a state modification message to instruct the server to modify the state information of the terminal from being stolen to being relieved of being stolen, then after the state information of the terminal is modified to be relieved of being stolen, the lawbreaker may perform processing such as a flash operation, etc. on the terminal, which results in an adverse consequence that the loser can not recover the terminal. The embodiment of the invention matches the hardware ID carried in the received state modification message with a hardware ID stored locally in the server, and if the hardware ID is matched, then the IMEI, the network card address and the serial number of the CPU of the terminal can all be matched, and then the legality of the received state modification message of the embodiment of the invention can be determined. After determining the legality of the state modification message, the state information of the terminal is modified to guarantee that the state information of the terminal stored in the server can be updated timely.

In addition, in the embodiment of the invention, the current state of the terminal may comprise that the terminal is stolen, the terminal is not stolen, and the terminal is recovered after stolen, and the like. After the terminal is stolen, the embodiment of the invention updates the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the embodiment of the invention timely updates the state of the terminal to be recovered after stolen, and the server also does not need to waste a resource such as a space, etc. to query and store related information of the terminal. Further, the current state of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

Now, the method for processing a stolen terminal of the invention will be further described in a specific embodiment.

Figure 2:
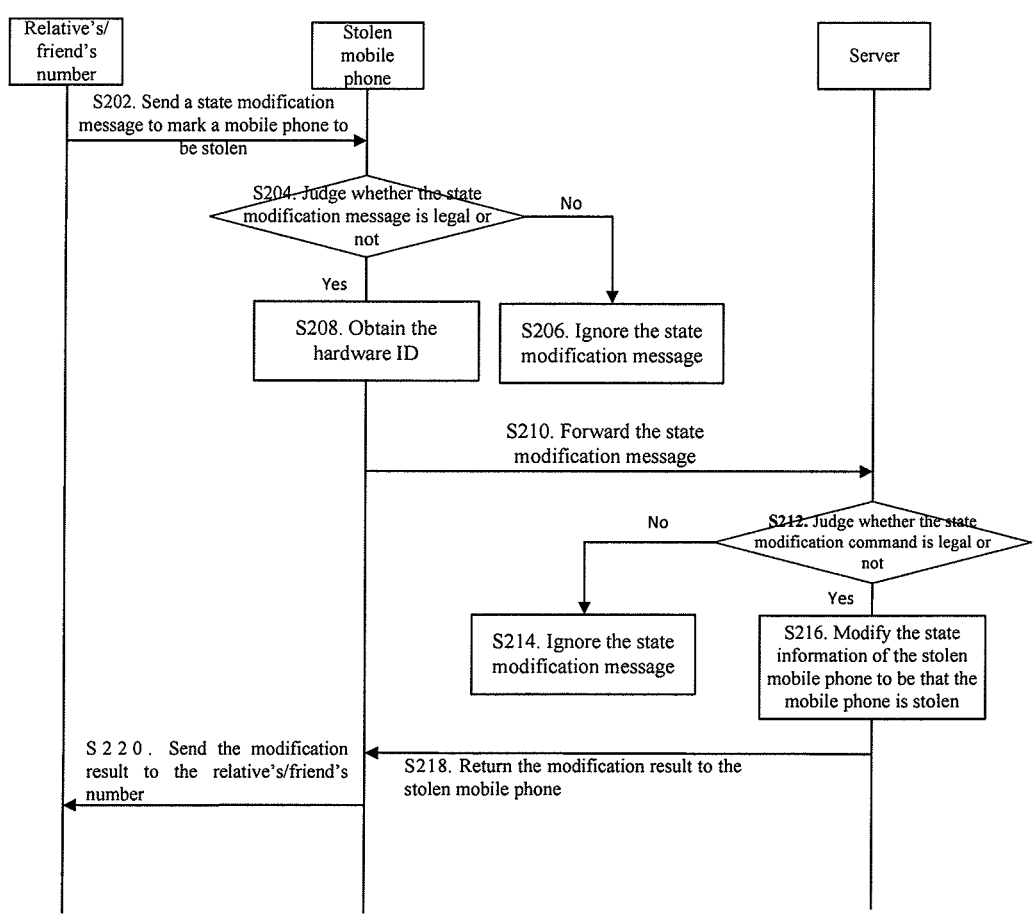
FIG. 2 shows a processing flow chart of a method for processing a stolen terminal according to another embodiment of the invention.

FIG. 2 shows a processing flow chart of a method for processing a stolen terminal according to a preferred embodiment of the invention, which is used for supporting any of the methods for processing a stolen terminal, and elaborating the above method for processing a stolen terminal more clearly and understandably. With reference to FIG. 2, the preferred embodiment comprises at least step S202 to step S220.

It needs to be noted that, to elaborate the preferred embodiment more simply and clearly, in the preferred embodiment, the sending party of the state modification message is set to be a relative's/friend's number, and the terminal is set to be a stolen terminal, wherein the relative's/friend's number is a number which is bound to the stolen mobile phone.

At the step S202, a relative's/friend's mobile phone sends a state modification message to the stolen mobile phone to mark the mobile phone to be stolen.

In particular, after the user finds that the mobile phone is stolen, he uses the relative's/friend's number bound to the stolen mobile phone to send a short message carrying a state modification message to the stolen mobile phone, to request marking the current state of the mobile phone to be that the mobile phone is stolen.

At the step S204, it is judged whether the state modification message is legal or not.

After receiving the state modification message sent by the relative's/friend's number, the stolen mobile phone judges whether the sending party of the state modification message matches a relative's/friend's number stored in the stolen mobile phone or not. If no, the step S206 is performed. If yes, the step S208 is performed.

At the step S206, when the stolen mobile phone judges that the state modification message is illegal, it ignores the state modification message.

At the step S208, when the stolen mobile phone judges that the state modification message is legal, it obtains its own hardware ID.

At the step S210, the state modification message is forwarded.

After the stolen mobile phone receives the state modification message and judges that the command is legal, the step S210 is performed to forward the state modification message which carries the hardware ID obtained by the step S208.

At the step S212, it is judged whether the state modification message is legal or not.

After receiving the state modification message forwarded by the stolen mobile phone, the server matches the hardware ID of the stolen mobile phone carried in the state modification message with a hardware ID stored locally in the server. If they can not match each other, then the server judges that the state modification message is illegal, and performs the step S214. If they can match each other, then the server judges the state modification message is legal, and performs the step S216.

At the step S214, when the server judges that the state modification message is illegal, it ignores the state modification message.

At the step S216, when the server judges that the state modification message is legal, it modifies the state information of the stolen mobile phone to be that the mobile phone is stolen.

After the server judges that the received state modification message is legal, the server modifies the state of the stolen mobile phone to be that the mobile phone is stolen according to the state modification message.

At the step S218, the modification result is returned to the stolen mobile phone.

After the server modifies the state information of the mobile phone to be that the mobile phone is stolen according to the state modification message, it returns the modification result to the stolen mobile phone, which guarantees the stolen mobile phone can know its own current state timely.

At the step S220, the modification result is sent to the relative's/friend's number.

After receiving the modification result returned by the server, the stolen mobile phone sends the modification result to the relative's/friend's number. Once the relative's/friend's number receives the modification of the state information of the stolen mobile phone, the user can know that the server has marked the stolen mobile phone.

Based on the methods for processing a stolen terminal provided in the above individual preferred embodiments and based on the same inventive concept, an embodiment of the invention provides a client for processing a stolen terminal, which is used for implementing a method for processing a stolen terminal as described above.

Figure 3:
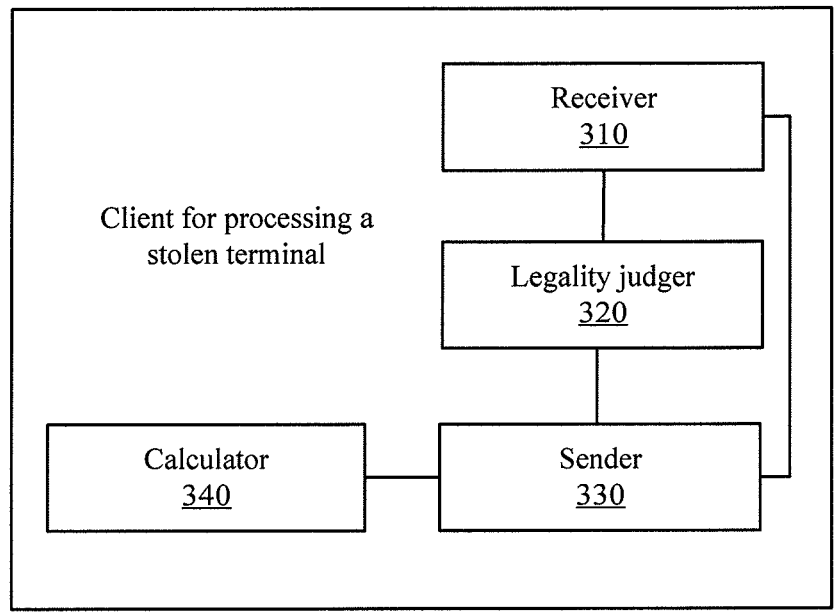
FIG. 3 shows a structural schematic diagram of a client for processing a stolen terminal according to an embodiment of the invention.

FIG. 3 shows a structural schematic diagram of a client for processing a stolen terminal according to an embodiment of the invention. With reference to FIG. 3, the client for processing a stolen terminal of the embodiment of the invention comprises at least a receiver 310, a legality judger 320 and a sender 330.

Now, functions of individual devices or components and a connection relationship between individual parts of the client for processing a stolen terminal of the embodiment of the invention will be introduced.

The receiver 310 is configured to receive a state modification message from a sending party, wherein the state modification message carries the current state of the terminal.

The legality judger 320 is coupled to the receiver 310 and configured to judge whether the state modification message is legal.

The sender 330 is coupled to the receiver 310 and the legality judger 320 respectively and configured to, in a case where the state modification message is legal, forward the state modification message to a server, so that the server modifies the state information of the terminal stored in the server to be the current state according to the state modification message After receiving a state modification message from a sending party, the embodiment of the invention performs legality verification on the state modification message, to guarantee that the received state modification message is an authentic, valid and credible command, and avoid that the state information of a terminal is maliciously modified due to reception of a state modification instruction sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. In a case where the state modification message is legal, the embodiment of the invention forwards the state modification message to a server, so that the server modifies the state information of the terminal stored in the server to be the current state according to the state modification message, which solves the problem in the prior art that other identification cannot be provided to indicate whether the terminal is stolen or not. By employing the client for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

In the embodiment of the invention, the receiver 310 in the client receives a state modification message from a sending party, and the identity of the sending party needs to be verified by the legality judger 320. If it is verified by the legality judger 320 that the sending party of the state modification message matches a credible number stored in the terminal, then the state modification message passes the legality verification, and anti-theft operations may continue to be performed; and if it is verified by the legality judger 320 that the sending party of the state modification message does not match any credible number stored in the terminal, it is unnecessary to continue to perform anti-theft operations.

In the embodiment of the invention, the identity of a sending party may generally be designated by a number, and the sending party corresponds to the number one to one. At a stolen terminal side, to guarantee the reliability of the identity verification of a sending party, generally, a list of credible numbers is provided, in which credible numbers of the stolen terminal are stored, for example, relatives'/friends' numbers, agreed authentication codes, etc. Therefore, when legality verification is performed on the state modification message, the number representative of the sending party may be matched with a credible number stored at the stolen terminal side. If the two match each other, then the sending party passes the identity verification, and the state modification message sent out by the sending party is legal. If the two do not match each other, then the sending party does not pass the identity verification, and accordingly, the state modification message sent out by the sending party is also illegal.

If it is verified by the legality judger 320 that the state modification message is illegal, then the client as shown in FIG. 3 ignores the state modification message. If it is verified by the legality judger 320 that the state modification message is legal, then the legality judger 320 triggers the sender 330, so that the sender 330 obtains the identity identification information of the terminal. After obtaining the identity identification information, the sender 330 sends the state modification message carrying the identity identification information to the server.

After receiving the state modification message carrying the identity identification information of the terminal, the server verifies whether the state modification message is legal or not. In particular, the server verifies the legality of the state modification message by judging whether the identity identification information carried in the state modification message matches identity identification information stored locally in the server. If the identity identification information carried in the state modification message matches identity identification information stored in the server, then it is judged that the state modification message is legal. If the identity identification information carried in the state modification message does not match identity identification information stored in the server, then it is judged the state modification message is illegal. When the server judges that the state modification message is illegal, the server ignores the state modification message. When the server judges that the state modification message is legal, the server modifies the state information of the terminal stored locally according to the state modification message, and returns the modification result.

After receiving the modification result returned by the server, the receiver 310 in the client as shown in FIG. 3 triggers the sender 330, so that the sender 330 forwards the modification result to the sending party of the state modification message. In the embodiment of the invention, after the current state of the terminal is modified, the modification result is sent to the client as shown in FIG. 3, and then forwarded to the sending party by the client, to remind both the terminal and the sending party respectively that the current state of the terminal is modified, and in turn enable the sending party to perform corresponding operations according to the modified current state of the terminal. For example, when the terminal is a mobile phone, the user uses a relative's/friend's number bound to the stolen mobile phone to send the state modification message to the stolen mobile phone to mark the mobile phone to be stolen. After the server modifies the current state of the mobile phone to be stolen according to the state modification message, if the modification result is returned to the relative's/friend's number, the user can know that the mobile phone has been marked to be stolen in time, and further perform other anti-theft operations on the stolen mobile phone.

In the embodiment of the invention, the identity identification information of the terminal may be the IMEI of the terminal, may be the user ID of the terminal, or also may be any identity identification information which can uniquely identify the terminal, which will not be defined by the embodiment of the invention. To increase the security of the terminal and determine that the state modification message received by the server is a legal state modification message verified by the terminal, preferably, the embodiment of the invention provides a terminal identity identification. The terminal identity identification is a hardware ID of the terminal.

Now, the obtaining of the hardware ID will be introduced in particular. It is mentioned above that after the legality judger 320 judges that the state modification message sent by the sending party is legal, the sender 330 obtains the hardware ID as the identity identification information of the terminal. In the embodiment of the invention, the sender 330 triggers a calculator 340, so that the calculator 340 calculates the hardware ID of the terminal. In particular, the calculator 340 first obtains the IMEI of the terminal, which is denoted as a first character string. Second, the calculator 340 obtains the network card address of the stolen mobile terminal, and removes the non-letter and non-numeric characters in the network card address, wherein the network card address after the removal is denoted as a second character string. After obtaining the first character string and the second character string, the calculator 340 obtains the serial number of the CPU of the terminal, which is denoted as a third character string. After obtaining the first, the second and the third character strings, the calculator 340 merges the three character strings according to a predetermined order. Therein, the predetermined order may be to merge the three character strings according to the order of first, second and third, may be to merge the three character strings according to the inverted order of third, second and first, or also may be other predetermined order, which will not be defined by the embodiment of the invention.

After merging the character strings, the calculator 340 converts the result obtained after the merging into a capital format, which is denoted as a first result. After obtaining the first result, the calculator 340 performs an MD5 calculation on the first result, to obtain a second result. Afterwards, the calculator 340 converts the second result into a capital format to obtain the hardware ID of the terminal.

In the embodiment of the invention, the hardware ID of the terminal is obtained by performing a merging operation on the IMEI, the network card address and the serial number of the CPU of the terminal, which can guarantee that the state modification message received by the server is authentic, valid and credible, and avoid that the server modifies the state information of the terminal erroneously due to reception of a state modification message sent from an incredible or malicious sending side which is disguised as the terminal. For example, if an incredible or malicious sending side which is disguised as the terminal sends a state modification message to instruct the server to modify the state information of the terminal from being stolen to being relieved of being stolen, then after the state information of the terminal is modified to be relieved of being stolen, the lawbreaker may perform processing such as a flash operation, etc. on the terminal, which results in an adverse consequence that the loser can not recover the terminal. The embodiment of the invention matches the hardware ID carried in the received state modification message with a hardware ID stored locally in the server, and if the hardware ID is matched, then the IMEI, the network card address and the serial number of the CPU of the terminal can all be matched, and then the legality of the received state modification message of the embodiment of the invention can be determined. After determining the legality of the state modification message, the state information of the terminal is modified to guarantee that the state information of the terminal stored in the server can be updated timely.

In addition, in the embodiment of the invention, the current state of the terminal may comprise that the terminal is stolen, the terminal is not stolen, and the terminal is recovered after stolen, and the like. After the terminal is stolen, the embodiment of the invention updates the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the embodiment of the invention timely updates the state of the terminal to be recovered after stolen, and the server also does not need to waste a resource such as a space, etc. to query and store related information of the terminal. Further, the current state of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

In the embodiment, the client (with reference to FIG. 3) for processing a stolen terminal can receive a state modification message from a sending party, and verify it. When passing the verification, the state modification message is forwarded to a server. That is, in the embodiment, the function of the client for processing a stolen terminal is to verify the legality of the state modification message.

Based on the methods and the client for processing a stolen terminal provided in the above individual preferred embodiments and based on the same inventive concept, an embodiment of the invention provides a server, which is used for implementing a method for processing a stolen terminal as described above.

Figure 4:
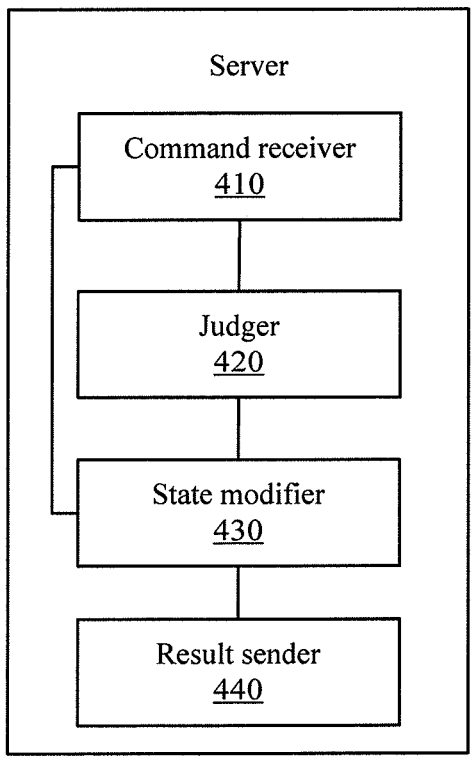
FIG. 4 shows a structural schematic diagram of a server according to an embodiment of the invention.

FIG. 4 shows a structural schematic diagram of a server according to an embodiment of the invention. With reference to FIG. 4, the server of the embodiment of the invention comprises at least: a command receiver 410 and a state modifier 430.

Now, functions of individual devices or components and a connection relationship between individual parts of the server of the embodiment of the invention will be introduced.

The command receiver 410 is configured to receive a state modification message sent by a terminal, wherein the state modification message carries the current state of the terminal and the identity identification information of the terminal.

The state modifier 430 is coupled to the command receiver 410 and configured to modify the state information of the terminal stored in the server to be the current state according to the state modification message.

In the embodiment of the invention, the state modification message is forwarded to the server, so that the server modifies the state information of the terminal stored in the server to be the current state according to the state modification message, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

After the command receiver 410 in the server as shown in FIG. 4 receives the state modification message carrying the identity identification information of the terminal, the state modifier 430 modifies the state information of the terminal stored locally according to the state modification message. Preferably, in an embodiment of the invention, a judger 420 as shown in FIG. 4 is added in the server. After the command receiver 410 receives the state modification message, the judger 420 judges whether the state modification message is legal or not. In particular, the judger 420 verifies the legality of the state modification message by judging whether the identity identification information carried in the state modification message matches identity identification information stored in the server or not. If the identity identification information carried in the state modification message matches identity identification information stored in the server, then the judger 420 judges the state modification message to be legal. If the identity identification information carried in the state modification message does not match identity identification information stored in the server, then the judger 420 judges the state modification message to be illegal.

In the embodiment of the invention, the identity identification information of the terminal may be the IMEI of the terminal, may be the user ID of the terminal, or also may be any identity information which can uniquely identify the terminal, which will not be defined by the embodiment of the invention. To increase the security of the terminal and determine that the state modification message received by the server is a legal state modification message verified by the terminal, preferably, the embodiment of the invention provides a terminal identity identification. The terminal identity identification is a hardware ID of the terminal.

After judging the legality of the state modification message, the judger 420 triggers the state modifier 430. The state modifier 430 performs a next operation according to the judgment result of the judger 420. When the state modification message is illegal, the state modifier 430 ignores the state modification message. When the state modification message is legal, the state modifier 430 modifies the state information of the terminal stored in the server to be the current state according to the state modification message.

After the state modifier 430 modifies the state information of the terminal stored locally to be the current state, a result sender 440 sends the modification result to the terminal. In the embodiment of the invention, after the state modifier 430 modifies the current state of the terminal, the result sender 440 sends the modification result to the terminal, and the terminal sends the modification result to the sending party, reminding the sending party of the current state of the terminal. The sending party can perform a corresponding operation according to the current state of the terminal.

In addition, in the embodiment of the invention, the current state of the terminal may comprise that the terminal is stolen, the terminal is not stolen, and the terminal is recovered after stolen, and the like. After the terminal is stolen, the state modifier 430 in the client updates the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the state modifier 430 timely updates the state of the terminal to be recovered after stolen, and the server also does not need to waste a resource such as a space, etc. to query and store related information of the terminal. Further, the current state of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

In the embodiment, the server (see FIG. 4) receives the state modification message which is verified by the terminal, and modifies it. That is, in the embodiment of the invention, the function of the server is for modifying the state information of the terminal stored locally. Of course, to increase the security, the state modification message may be further verified.

According to any one of the preferred embodiments or a combination of multiple preferred embodiments, embodiments of the invention can achieve the following beneficial effects:

after receiving a state modification message from a sending party, the embodiment of the invention performs legality verification on the state modification message to guarantee that the received state modification message is an authentic, valid and credible command, and avoid that the state information of a terminal is maliciously modified due to reception of a state modification instruction sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. In a case where the state modification message is legal, the method provided by the embodiment of the invention forwards the state modification message to the server, so that the server modifies the state information of the terminal stored in the server to be the current state according to the state modification message, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

Embodiment Two

Figure 5:
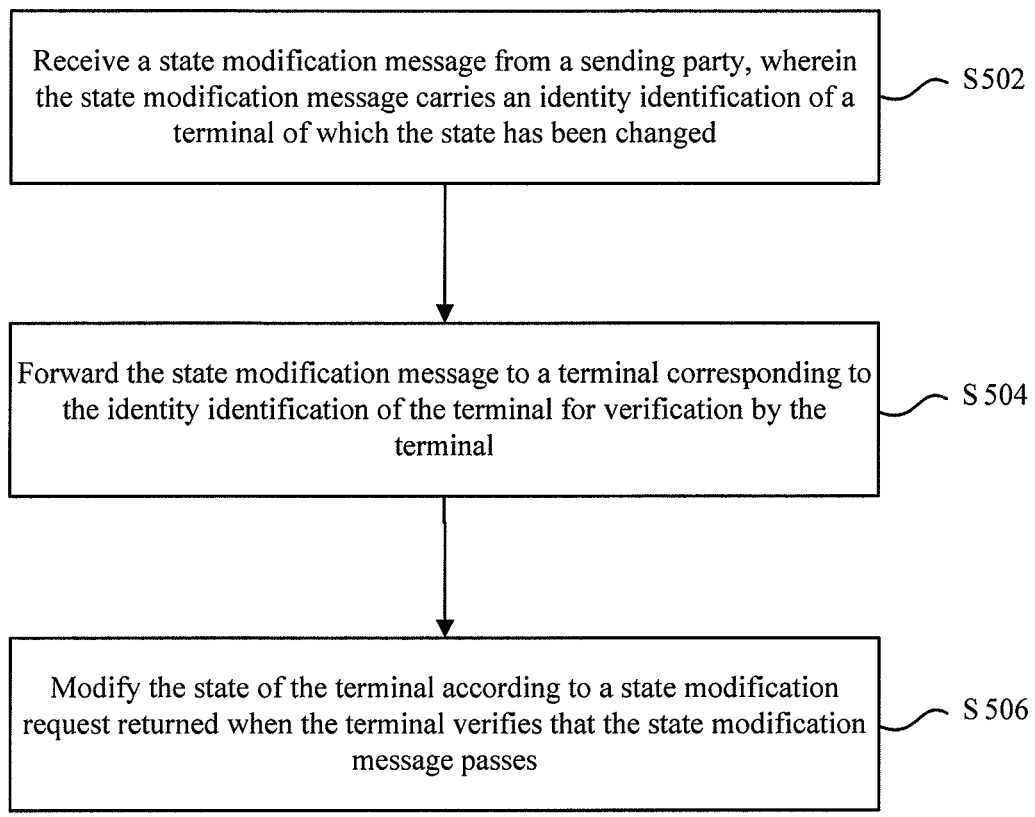
FIG. 5 shows a processing flow chart of a method for processing a stolen terminal according to still another embodiment of the invention.

The embodiment provides a method for processing a stolen terminal. FIG. 5 shows a processing flow chart of a method for processing a stolen terminal according to an embodiment of the invention. As shown in FIG. 5, the flow comprises at least step S502 to step S506.

At the step S502, a state modification message from a sending party is received, wherein the state modification message carries identity identification information of a terminal of which the state has been changed.

At the step S504, the state modification message is forwarded to a terminal corresponding to the identity identification information of the terminal for verification by the terminal.

At the step S506, the state information of the terminal is modified according to a state modification request returned when the terminal verifies that the state modification message passes.

The embodiment of the invention receives a state modification message from a sending party and forwards it to a corresponding terminal, so that the terminal verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the terminal verifies that the state modification message is legal, the embodiment of the invention receives a state modification request returned by the terminal, and modifies the state information of the terminal according to the state modification request, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

When the step S502 is performed, a state modification message from a sending party is received, wherein the state modification message carries identity identification information of a terminal of which the state has been changed. Preferably, to guarantee that the received state modification message is authentic, valid and credible, the embodiment of the invention verifies the received state modification message. If the state modification message passes the verification, anti-theft operations may continue to be performed; and if the state modification message does not pass the verification, it is unnecessary to continue to perform anti-theft operations.

In the embodiment of the invention, the state modification message carries the identity identification information of the terminal, whereas in the server is stored identity identification information of individual terminals. If the identity identification information of the terminal carried in the state modification message can match identity identification information of a terminal stored in the server, then the state modification message passes the legality verification, and the step S504 as shown in FIG. 5 is performed, in which the embodiment of the invention forwards the state modification message to a terminal corresponding to the identity identification information; and if it is not matched, then the state modification message does not pass the legality verification, and accordingly, the embodiment of the invention ignores the state modification message and does not perform any operation.

After the embodiment of the invention forwards the state modification message to a corresponding terminal, the terminal cannot guarantee that the server which forwards the state modification message is a reliable server, and in turn, verification of the state modification message at the server side also cannot be trusted. To ensure that the state modification message received by the terminal is not a state modification message sent to the terminal by a malicious server, the terminal again performs legality verification on the received state modification message. After the terminal receives the state modification message, the embodiment of the invention judges whether the identification information of the terminal carried in the state modification message matches identity identification information stored locally in the terminal. If yes, the state modification message is legal, and if no, the state modification message is illegal.

According to the result of legality verification of the state modification message, the terminal performs a different operation. In particular, if the state modification message is illegal, then the state modification message is ignored, and if the state modification message is legal, the terminal obtains its own ID and returns a state modification request carrying the hardware ID.

After receiving the state modification request, the embodiment of the invention performs legality verification on the state modification request according to the hardware ID carried in the state modification request. In particular, if the hardware ID carried in the state modification request can match a hardware ID stored locally in the server, then the state modification request passes the legality verification; and if it cannot be matched, then the state modification request cannot pass the legality verification. If the state modification request cannot pass the legality verification, the embodiment of the invention ignores the state modification request and does not perform any operation. If the state modification request passes the legality verification, the embodiment of the invention utilizes the server to modify the state information of the terminal, which guarantees that the state information of the terminal stored in the server can be updated to the current state of the terminal in time.

In the embodiment of the invention, the two-time legality verification of the state modification message is via the identity identification of the terminal, whereas for verification of the state modification request, to improve the security, it is determined that the received state modification request is a legal state modification request, and the embodiment of the invention uses the hardware ID of the terminal to perform legality verification on the state modification request.

Therein, the identity identification information of the terminal may be the IMEI of the terminal, may be the user ID of the terminal, or also may be any identity identification information which can uniquely identify the terminal, which will not be defined by the embodiment of the invention.

The hardware ID of the terminal is comprehensive identity identification information which assembles various identity identification information of the terminal. Now, the obtaining of the hardware ID will be introduced particularly. As described above, if the state modification message is legal, the embodiment of the invention obtains the hardware ID of the terminal. Therein, the way of obtaining the hardware ID is identical to that of Embodiment One.

In the embodiment of the invention, the hardware ID of the terminal is obtained by performing a merging operation on the IMEI, the network card address and the serial number of the CPU of the terminal, which can guarantee that the state modification message received by the server is authentic, valid and credible, and avoid that the server modifies the state information of the terminal erroneously due to reception of a state modification message sent from an incredible or malicious sending side which is disguised as the terminal. For example, if an incredible or malicious sending side which is disguised as the terminal sends a state modification message to instruct the server to modify the state information of the terminal from being stolen to being relieved of being stolen, then after the state information of the terminal is modified to be relieved of being stolen, the lawbreaker may perform processing such as a flash operation, etc. on the terminal, which results in an adverse consequence that the loser cannot recover the terminal. The embodiment of the invention matches the hardware ID carried in the received state modification message with a hardware ID stored locally in the server, and if the hardware ID is matched, then the IMEI, the network card address and the serial number of the CPU of the terminal can all be matched, and then the legality of the received state modification message of the embodiment of the invention can be determined. After determining the legality of the state modification message, the state information of the terminal is modified to guarantee that the state information of the terminal stored in the server can be updated timely.

In the embodiment of the invention, modification of the state information of the terminal may comprise modifying the state information of the terminal to be stolen, not stolen, or to be that the terminal is recovered after stolen, or the like. After the terminal is stolen, the embodiment of the invention modifies the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the embodiment of the invention timely modifies the state information of the terminal to be recovered after stolen, and the server also does not need to waste a resource such as a space, etc. to query and store related information of the terminal. Further, the state information of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

In the embodiment of the invention, after the state information of the terminal is modified to be the current state, the embodiment of the invention may return the modification result to the sending party of the state modification message. In the embodiment of the invention, after the current state of the terminal is modified, the modification result is sent to the sending party to remind the sending party that the current state of the terminal has been modified, and in turn enable the sending party to perform a corresponding operation according to the modified current state of the terminal. For example, when the terminal is a mobile phone, the user uses a relative's/friend's number bound to the stolen mobile phone to send a state modification message to the stolen mobile phone to mark the mobile phone to be stolen. After the server modifies the current state of the mobile phone to be stolen according to the state modification message, if the modification result is returned to the relative's/friend's number, the user can know that the mobile phone has been marked to be stolen in time, and further perform other anti-theft operations on the stolen mobile phone.

The embodiment of the invention may further generate a task ID for performing the modification operation after the state modification message passes the legality verification, and send the task ID to the sending party of the state modification message. After receiving the task ID, the sending party determines that the state modification message has passed the legality verification by the server. In addition, the sending party can send a query request carrying the task ID to the server at any time, to query about the implementation of the modification operation by the server. After receiving the query request from the sending party, the server determines the implementation of the current modification operation according to the task ID carried in the query request, and returns it to the sending party. For example, when the terminal is a mobile phone, if the mobile phone is lost, the user can send a state modification message to the server, and receive a task ID returned by the server. According to the task ID, the user can query about the implementation of the state modification operation by the server at any time. If the current modification operation can not continue to be performed due to server failure, etc., the user can timely know related information that the operation cannot be performed, and take corresponding measures according to the known related information, which protects the security of the stolen mobile phone more efficiently.

In the embodiment of the invention, the sending party of the state modification message may be disposed in a mobile terminal, for example, a mobile phone, a notebook computer, etc., and send the state modification message in the form of short message or network. The sending party in the embodiment of the invention may be further disposed in a terminal, e.g., a computer, and send the state modification message in the form of network. By employing the embodiment of the invention, the state information of the terminal can be modified in time. For example, after the terminal is stolen, the user can send a state modification message via various message sending platforms, which ensures that the terminal is marked to be stolen in time, and can further know related information of the stolen terminal in time, which increases the probability of recovering the stolen terminal.

Now, the method for processing a stolen terminal of the invention will be further described in a specific embodiment.

Figure 6:
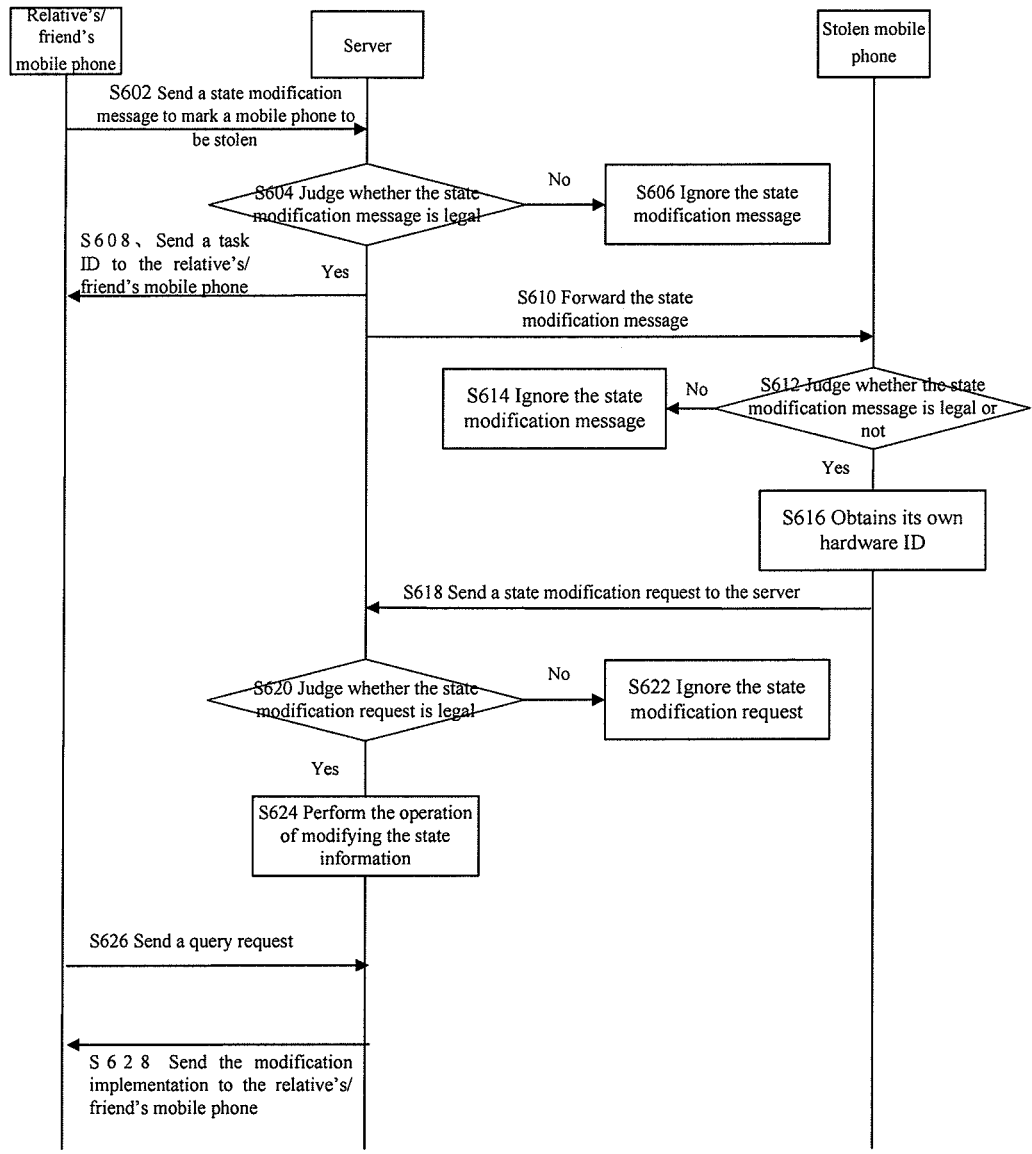
FIG. 6 shows a processing flow chart of a method for processing a stolen terminal according to still another embodiment of the invention.

FIG. 6 shows a processing flow chart of a method for processing a stolen terminal according to a preferred embodiment of the invention, which is used for supporting any of the methods for processing a stolen terminal, and elaborating the above method for processing a stolen terminal more clearly and understandably. With reference to FIG. 6, the preferred embodiment comprises at least step S602 to step S628.

It needs to be noted that, to elaborate the preferred embodiment more simply and clearly, in the preferred embodiment, the sending party of the state modification message is set in a relative's/friend's mobile phone, and the terminal is set to be a stolen terminal, wherein the relative's/friend's mobile phone is a mobile phone where a relative's/friend's number bound to the stolen mobile phone is located.

At the step S602, a state modification message is sent to mark a mobile phone to be stolen.

After a mobile phone is stolen, the user uses a relative's/friend's mobile phone to send a state modification message to a server via a network, to mark the mobile phone to be stolen.

At the step S604, it is judged whether the state modification request is legal.

After receiving the state modification message, the server judges whether the state modification message is legal. If yes, the step S608 is performed, and if no, the step S606 is performed.

At the step S606, the state modification message is illegal, and the state modification message is ignored.

At the step S608, a task ID is sent to the relative's/friend's mobile phone.

In particular, after it is judged by the server that the state modification message is illegal, the server generates a task ID for performing the modification operation, and sends the task ID to the relative's/friend's mobile phone via a network.

At the step S610, the state modification message is forwarded.

At the step S612, it is judged whether the state modification message is legal or not.

After verifying that the received state modification message is legal, the server forwards the state modification message to the stolen mobile phone. After receiving the state modification message, the stolen mobile phone again performs legality verification on the state modification message. If the state modification message does not pass the legality verification, the step S614 is performed, and if it passes the verification, the step S616 is performed.

At the step S614, when the state modification message does not pass the legality verification, the state modification message is ignored.

At the step S616, when the state modification message passes the legality verification, the stolen mobile phone obtains its own hardware ID.

At the step S618, a state modification request is sent to the server.

After the stolen mobile phone obtains its own hardware ID, it sends a state modification request carrying the hardware ID to the server.

At the step S620, it is judged whether the state modification request is legal. After receiving the state modification request, the server judges whether the state modification request is legal according to the hardware ID carried in the state modification request. If no, the step S622 is performed, and if yes, the step S624 is performed.

At the step S622, when the state modification request is illegal, the server ignores the state modification request.

At the step S624, when the state modification request is legal, the operation of modifying the state information is performed.

At the step S626, a query request is sent.

After receiving the task ID sent by the server, the relative's/friend's mobile phone can send a query request carrying the task ID to the server via a network, to query about the implementation of the modification operation by the server.

At the step S628, the modification implementation is sent to the relative's/friend's mobile phone.

After receiving the query request sent by the relative's/friend's mobile phone, the server obtains the implementation of the current modification operation according to the task ID carried in the query request, and returns the implementation to the relative's/friend's mobile phone via the network.

Figure 7:
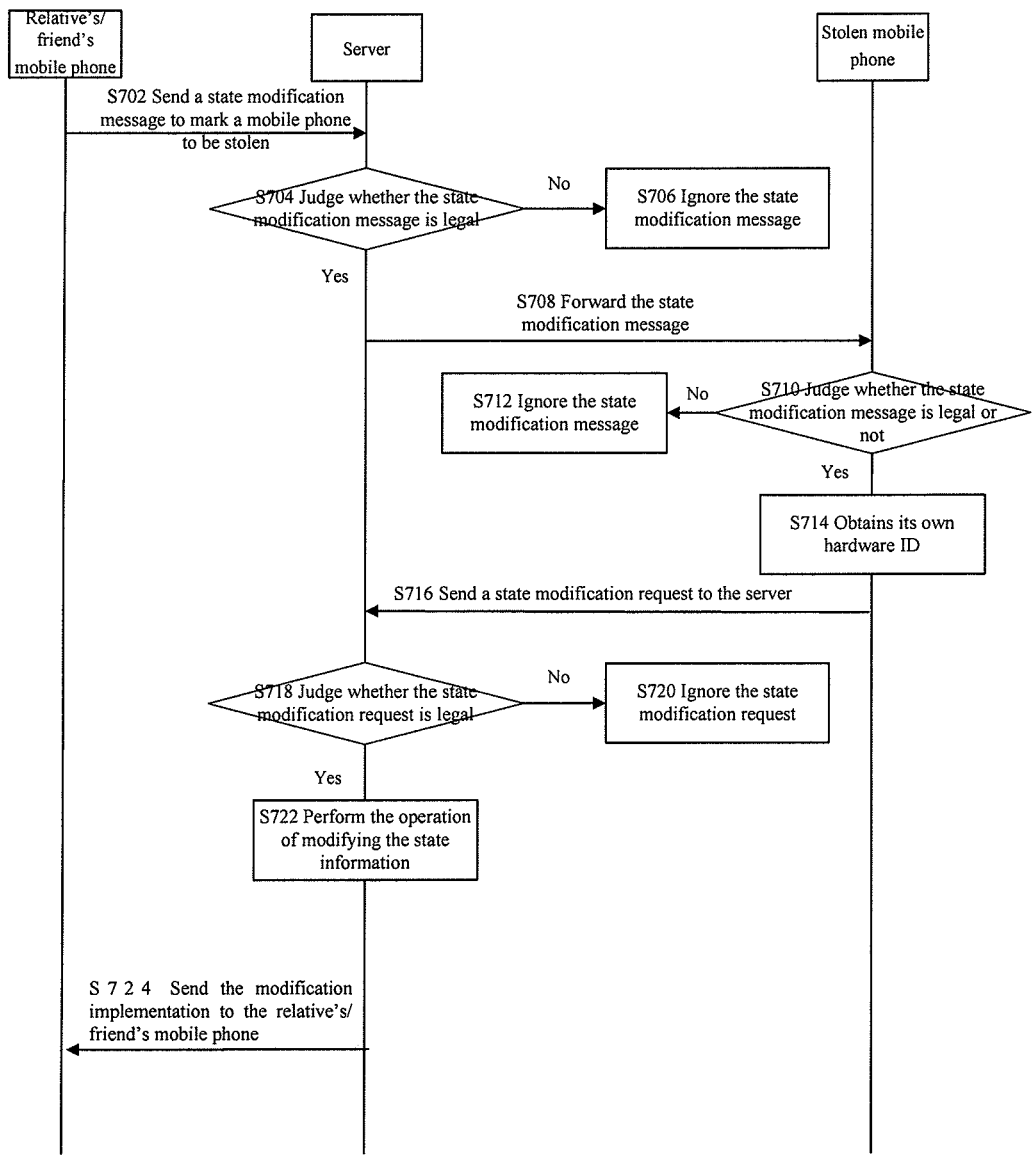
FIG. 7 shows a processing flow chart of a method for processing a stolen terminal according to still another embodiment of the invention.

FIG. 7 shows a processing flow chart of a method for processing a stolen terminal according to another preferred embodiment of the invention, which is used for supporting any of the methods for processing a stolen terminal, and elaborating the above method for processing a stolen terminal more clearly and understandably. With reference to FIG. 7, the preferred embodiment comprises at least step S702 to step S724.

It needs to be noted that, to elaborate the preferred embodiment more simply and clearly, in the preferred embodiment, the sending party of the state modification message is set in a relative's/friend's mobile phone, and the terminal is set to be a stolen terminal, wherein the relative's/friend's mobile phone is a mobile phone where a relative's/friend's number bound to the stolen mobile phone is located.

At the step S702, a state modification message is sent to mark a mobile phone to be stolen.

After a mobile phone is stolen, the user uses a relative's/friend's mobile phone to send a state modification message to a server via short message, to mark the mobile phone to be stolen.

At the step S704, it is judged whether the state modification request is legal.

After receiving the state modification message, the server judges whether the state modification message is legal. If yes, the step S708 is performed, and if no, the step S706 is performed.

At the step S706, the state modification message is illegal, and the state modification message is ignored.

At the step S708, the state modification message is forwarded.

At the step S710, it is judged whether the state modification message is legal or not.

After verifying that the received state modification message is legal, the server forwards the state modification message to the stolen mobile phone. After receiving the state modification message, the stolen mobile phone again performs legality verification on the state modification message. If the state modification message does not pass the legality verification, the step S712 is performed, and if it passes the verification, the step S714 is performed.

At the step S712, when the state modification message does not pass the legality verification, the state modification message is ignored.

At the step S714, when the state modification message passes the legality verification, the stolen mobile phone obtains its own hardware ID.

At the step S716, a state modification request is sent to the server.

After the stolen mobile phone obtains its own hardware ID, it sends a state modification request carrying the hardware ID to the server.

At the step S718, it is judged whether the state modification request is legal.

After receiving the state modification request, the server judges whether the state modification request is legal according to the hardware ID carried in the state modification request. If no, the step S720 is performed, and if yes, the step S722 is performed.

At the step S720, when the state modification request is illegal, the server ignores the state modification request.

At the step S722, when the state modification request is legal, the operation of modifying the state information is performed.

At the step S724, the modification implementation is sent to the relative's/friend's mobile phone via short message.

Note that the sending step at S702 and S724 may also be conducted via a network, and the invention is not limited thereto.

Based on the methods for processing a stolen terminal provided in the above individual preferred embodiments and based on the same inventive concept, an embodiment of the invention provides a server, which is used for implementing a method for processing a stolen terminal as described above.

Figure 8:
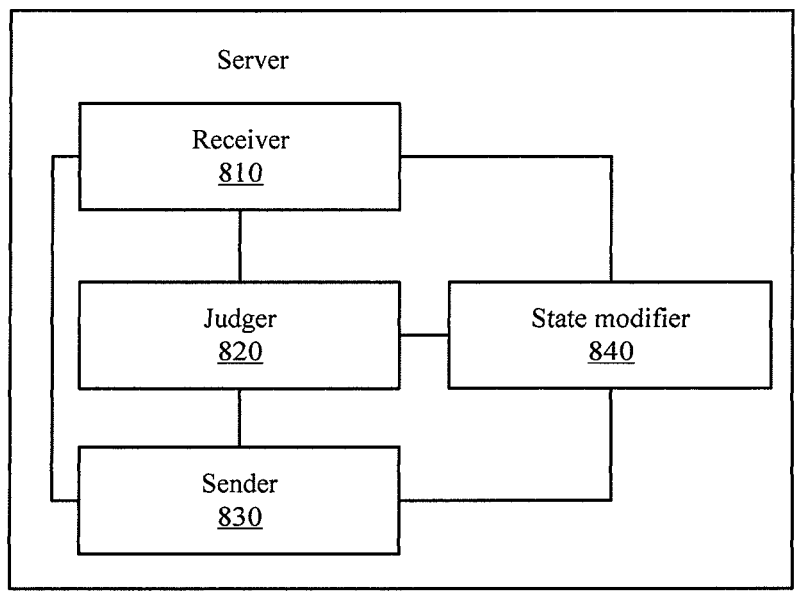
FIG. 8 shows a structural schematic diagram of a server according to another embodiment of the invention.

FIG. 8 shows a structural schematic diagram of a server according to an embodiment of the invention. With reference to FIG. 8, the server of the embodiment of the invention comprises at least a receiver 810, a sender 830 and a state modifier 840.

Now, functions of individual devices or components and a connection relationship between individual parts of the server of the embodiment of the invention will be introduced.

The receiver 810 is configured to receive a state modification message from a sending party, wherein the state modification message carries identity identification information of a terminal of which the state has been changed.

The sender 830 is coupled to the receiver 810 and configured to forward the state modification message to a terminal corresponding to the identity identification information of the terminal for verification by the terminal.

The state modifier 840 is coupled to the receiver 810 and configured to modify the state information of the terminal according to a state modification request returned when the terminal verifies that the state modification message passes.

The embodiment of the invention receives a state modification message from a sending party and forwards it to a corresponding terminal, so that the terminal verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the terminal verifies that the state modification message is legal, the embodiment of the invention receives a state modification request returned by the terminal, and modifies the state information of the terminal according to the state modification request, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

The receiver 810 in the server as shown in FIG. 8 receives a state modification message from a sending party, wherein the state modification message carries identity identification information of a terminal of which the state has been changed. Preferably, to guarantee that the received state modification message is authentic, valid and credible, a judger 820 in the server performs legality judgment on the received state modification message. If it is judged by the judger 820 that the state modification message is legal, then anti-theft operations continue to be performed; and if it is judged by the judger 820 that the state modification message is illegal, it is unnecessary to continue to perform anti-theft operations.

In the embodiment of the invention, the state modification message carries the identity identification information of the terminal, whereas in the server is stored identity identification information of individual terminals. If the identity identification information of the terminal carried in the state modification message can match identity identification information of a terminal stored in the server, then the judger 820 judges that the state modification message passes the legality verification, and the sender 830 forwards the state modification message to a terminal corresponding to the identity identification information; and if it is not matched, then the judger 820 judges that the state modification message does not pass the legality verification, and accordingly, the server ignores the state modification message and does not perform any operation.

After the state modification message is sent to the terminal, the terminal performs legality verification on the state modification message. If the state modification message does not pass the legality verification, the terminal ignores the state modification message. If the state modification message passes the legality verification, the terminal obtains its own hardware ID, and sends a state modification request carrying the hardware ID to a server as shown in FIG. 4.

After receiving the state modification request, the receiver 810 in the server triggers the judger 820. The judger 820 judges whether the state modification request is legal or not. In the embodiment of the invention, the judger 820 judges whether the state modification request is legal or not by judging whether the hardware ID carried in the state modification request matches a hardware ID stored locally in the server. If the hardware ID carried in the state modification request does not match a hardware ID stored locally in the server, the judger 820 judges that the state modification request is illegal, and the server ignores the state modification request. If the hardware ID carried in the state modification request matches a hardware ID stored locally in the server, the judger 820 judges that the state modification request is legal, and triggers the state modifier 840 coupled to it. The state modifier 840 modifies the state information of the terminal according to the state modification request.

In the embodiment of the invention, modification of the state information of the terminal by the state modifier 840 may comprise modifying the state information of the terminal to be stolen, not stolen, or to be that the terminal is recovered after stolen, or the like. After the terminal is stolen, the state modifier 840 in the server modifies the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the state modifier 840 in the server timely modifies the state information of the terminal to be recovered after stolen, and the server also does not need to waste a resource such as a space, etc. to query and store related information of the terminal. Further, the state information of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

In the embodiment of the invention, after modifying the state information of the terminal to be the current state, the state modifier 840 triggers the sender 830. The sender 830 may return the modification result to the sending party of the state modification message. In the embodiment of the invention, the sender 830 sends the modification result to the sending party, to remind the sending party that the current state of the terminal has been modified, and in turn enable the sending party to perform a corresponding operation according to the modified current state of the terminal. For example, when the terminal is a mobile phone, the user uses a relative's/friend's number bound to the stolen mobile phone to send a state modification message to the stolen mobile phone to mark the mobile phone to be stolen. After the server modifies the current state of the mobile phone to be stolen according to the state modification message, if the modification result is returned to the relative's/friend's number, the user can know that the mobile phone has been marked to be stolen in time, and further perform other anti-theft operations on the stolen mobile phone.

The embodiment of the invention may further generate a task ID for performing the modification operation after the judger 820 judges that the state modification message passes the legality verification, and the receiver 810 sends the task ID to the sending party of the state modification message. After receiving the task ID, the sending party determines that the state modification message has passed the legality verification by the server. In addition, the sending party can send a query request carrying the task ID to the server at any time, to query about the implementation of the modification operation by the server. After receiving the query request from the sending party, the receiver 810 in the server determines the implementation of the current modification operation according to the task ID carried in the query request, and triggers the sender 830 to return the implementation of the modification operation to the sending party. For example, when the terminal is a mobile phone, if the mobile phone is lost, the user can send a state modification message to the server, and receive a task ID returned by the server. According to the task ID, the user can query about the implementation of the state modification operation by the server at any time. If the current modification operation cannot continue to be performed due to server failure, etc., the user can timely know related information that the operation cannot be performed, and take corresponding measures according to the known related information, which protects the security of the stolen mobile phone more efficiently.

In the embodiment, the server (see FIG. 8) receives a state modification message from a sending party, and forwards it to a corresponding terminal for identity verification. When the verification is passed, the terminal sends a state modification request to the server, so that the server modifies the state information. That is, in the embodiment of the invention, the functions of the server are for forwarding the state modification message, and modifying the state information of the terminal stored locally according to a corresponding request after the verification is passed. Of course, to increase the security, further verification may be performed on the state modification message.

Based on the methods for processing a stolen terminal and the server provided in the above individual preferred embodiments and based on the same inventive concept, an embodiment of the invention provides a client for processing a stolen terminal, which is used for implementing a method for processing a stolen terminal as described above.

Figure 9:
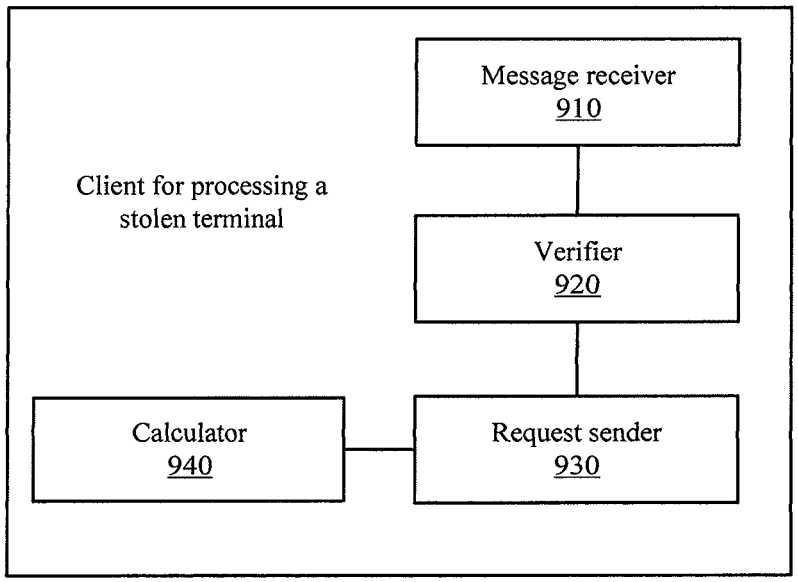
FIG. 9 shows a structural schematic diagram of a client for processing a stolen terminal according to another embodiment of the invention.

FIG. 9 shows a structural schematic diagram of a client for processing a stolen terminal according to an embodiment of the invention. With reference to FIG. 9, the client for processing a stolen terminal of the embodiment of the invention comprises at least a message receiver 910, a verifier 920 and a request sender 930.

Now, functions of individual devices or components and a connection relationship between individual parts of the client for processing a stolen terminal of the embodiment of the invention will be introduced.

The message receiver 910 is configured to receive a state modification message from a sending party and forwarded by a server.

The verifier 920 is coupled to the message receiver 910 and configured to verify the received state modification message.

The request sender 930 is coupled to the verifier 920 and configured to, after the state modification message passes the verification, return a state modification request to the server, so that the server modifies the state of the terminal according to the state modification request.

The embodiment of the invention receives a state modification message from a sending party and forwards it to a corresponding terminal, so that the terminal verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the terminal verifies that the state modification message is legal, the embodiment of the invention receives a state modification request returned by the terminal, and modifies the state information of the terminal according to the state modification request, which solves the problem in the prior art that other identification can not be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

After receiving a state modification message from a sending party and forwarded by a server, the message receiver 910 in the client as shown in FIG. 9 triggers the verifier 920. To guarantee that the received state modification message is not a state modification message sent by a malicious server, the verifier 920 performs legality verification on the state modification message according to the identity identification information of the terminal carried in the state modification message. If it is verified by the verifier 920 that the identity identification information of the terminal carried in the state modification message matches the identity identification information stored locally in the terminal, then the state modification message is legal. If it is verified by the verifier 920 that the identity identification information of the terminal carried in the state modification message does not match the identity identification information stored locally in the terminal, then the state modification message is illegal.

As described above, the verifier 920 verifies whether the state modification message received by the message receiver 910 is legal or not, and performs a next operation according to the verification result. In particular, if the state modification message is illegal, then the client as shown in FIG. 9 ignores the state modification message and does not perform any operation. If the state modification message is legal, then the verifier 920 triggers the request sender 930. The request sender 930 obtains the hardware ID of the terminal, and sends a state modification request carrying the hardware ID to the server.

Before sending a state modification request to the server, the request sender 930 obtains the hardware ID of the terminal from a calculator 940 coupled to it. Now, the obtaining of the hardware ID will be introduced in particular. As described above, after the verifier 920 verifies that the state modification message is legal, the request sender 930 obtains the hardware ID as the identity identification information of the terminal. In the embodiment of the invention, the request sender 930 triggers the calculator 940, so that the calculator 940 calculates the hardware ID of the terminal. In particular, the calculator 940 first obtains the IMEI of the terminal, which is denoted as a first character string. Second, the calculator 940 obtains the network card address of the stolen mobile terminal, and removes the non-letter and non-numeric characters in the network card address, wherein the network card address after the removal is denoted as a second character string. After obtaining the first character string and the second character string, the calculator 940 obtains the serial number of the CPU of the terminal, which is denoted as a third character string. After obtaining the first, the second and the third character strings, the calculator 940 merges the three character strings according to a predetermined order. Therein, the predetermined order may be to merge the three character strings according to the order of first, second and third, may be to merge the three character strings according to the inverted order of third, second and first, or also may be other predetermined order, which will not be defined by the embodiment of the invention.

After merging the character strings, the calculator 940 converts the result obtained after the merging into a capital format, which is denoted as a first result. After obtaining the first result, the calculator 940 performs an MD5 calculation on the first result, to obtain a second result. Afterwards, the calculator 940 converts the second result into a capital format to obtain the hardware ID of the terminal.

In the embodiment of the invention, the hardware ID of the terminal is obtained by performing a merging operation on the IMEI, the network card address and the serial number of the CPU of the terminal, which can guarantee that the state modification message received by the server is authentic, valid and credible, and avoid that the server modifies the state information of the terminal erroneously due to reception of a state modification message sent from an incredible or malicious sending side which is disguised as the terminal. For example, if an incredible or malicious sending side which is disguised as the terminal sends a state modification message to instruct the server to modify the state information of the terminal from being stolen to being relieved of being stolen, then after the state information of the terminal is modified to be relieved of being stolen, the lawbreaker may perform processing such as a flash operation, etc. on the terminal, which results in an adverse consequence that the loser cannot recover the terminal. The embodiment of the invention matches the hardware ID carried in the received state modification message with a hardware ID stored locally in the server, and if the hardware ID is matched, then the IMEI, the network card address and the serial number of the CPU of the terminal can all be matched, and then the legality of the received state modification message of the embodiment of the invention can be determined. After determining the legality of the state modification message, the state information of the terminal is modified to guarantee that the state information of the terminal stored in the server can be updated timely.

In the embodiment, the client (with reference to FIG. 9) for processing a stolen terminal can receive a state modification message from a server party, and verify it. When passing the verification, the state modification request is forwarded to the server. That is, in the embodiment, the function of the client for processing a stolen terminal is to verify the legality of the state modification message.

According to any one of the preferred embodiments or a combination of multiple preferred embodiments, embodiments of the invention can achieve the following beneficial effects:

The embodiment of the invention receives a state modification message from a sending party and forwards it to a corresponding terminal, so that the terminal verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the terminal verifies that the state modification message is legal, the embodiment of the invention receives a state modification request returned by the terminal, and modifies the state information of the terminal according to the state modification request, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

Embodiment Three

Figure 10:
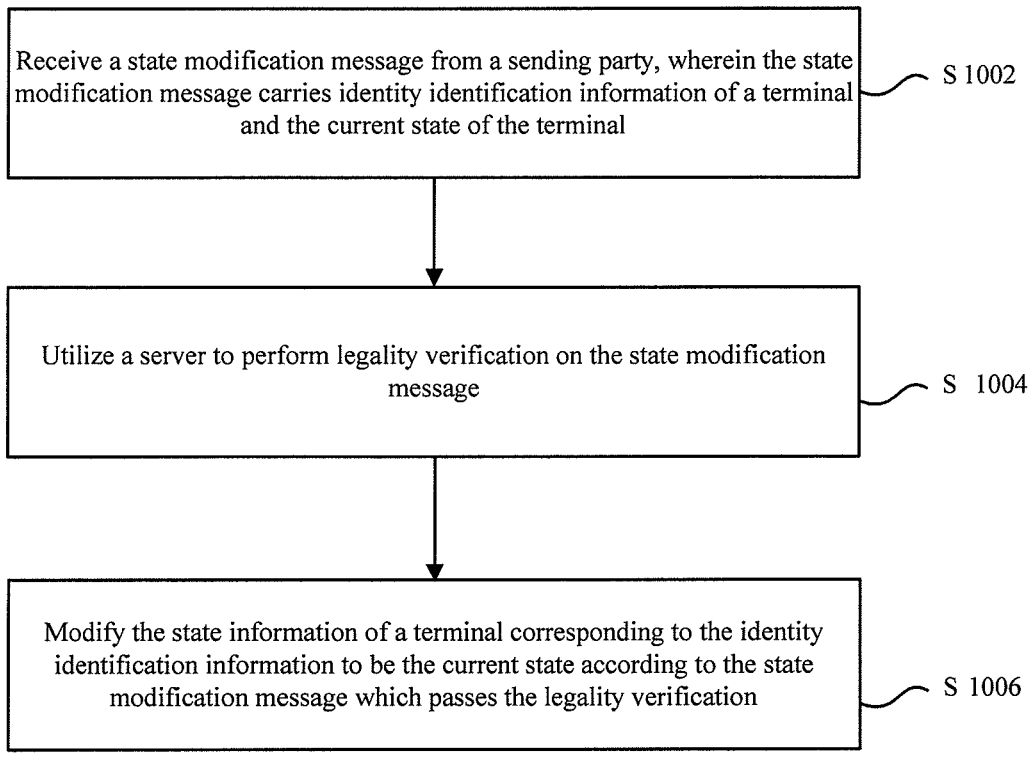
FIG. 10 shows a processing flow chart of a method for processing a stolen terminal according to still another embodiment of the invention.

The embodiment provides a method for processing a stolen terminal. FIG. 10 shows a processing flow chart of a method for processing a stolen terminal according to still an embodiment of the invention. As shown in FIG. 10, the flow comprises at least step S1002 to step S1006.

At the step S1002, a state modification message from a sending party is received, wherein the state modification message carries identity identification information of a terminal and the current state of the terminal.

At the step S1004, a server is utilized to perform legality verification on the state modification message.

At the step S1006, the state information of a terminal corresponding to the identity identification information is modified to be the current state according to the state modification message which passes the legality verification.

The embodiment of the invention receives a state modification message from a sending party, and verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the state modification message passes the legality verification, the embodiment of the invention modifies the state information of the terminal according to the state modification message, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

As shown at the step S1002 and the step S1004 in FIG. 10, after receiving a state modification message from a sending party, to guarantee that the received state modification message is authentic, valid and credible, and avoid that a server modifies the state information of a terminal erroneously due to reception of a state modification message sent from an incredible or malicious sending side, the embodiment of the invention utilizes a server to perform legality verification on the state modification message.

It is mentioned above that the state modification message from the sending party carries the identity identification information of a terminal, and the embodiment of the invention verifies the legality of the state modification message by utilizing whether the identity identification information of the terminal matches identity identification information stored locally in the server. In particular, if the identity identification information of the terminal carried in the state modification message can match identity identification information stored locally in the server, then the state modification message is legal; and if the identity identification information of the terminal carried in the state modification message can not match identity identification information stored locally in the server, then the state modification message is illegal.

According to the verification result of the state modification message, the embodiment of the invention performs a different operation. If the state modification message is illegal, the embodiment of the invention cannot guarantee that the state modification message received by the server is authentic, valid and credible, and cannot guarantee that the sending party of the state modification message is not an incredible or malicious sending side. Therefore, when it is verified by the embodiment of the invention that the state modification message is illegal, to guarantee that the server will not modify the state information of the terminal erroneously according to a state modification message from an incredible party, the embodiment of the invention ignores the received state modification message, and does not perform any operation.

If the state modification message is legal, according to the identification information of the terminal carried in the state modification message, the embodiment of the invention determines a terminal corresponding to the identification information. After determining the corresponding terminal, the embodiment of the invention modifies the state information of the terminal stored locally in the server correspondingly according to the current state of the terminal in the state modification message, which guarantees that the state information of the terminal stored in the server can be updated in time.

In the embodiment of the invention, the current state of the terminal may comprise that the terminal is stolen, the terminal is not stolen, and the terminal is recovered after stolen, and the like. After the terminal is stolen, the embodiment of the invention modifies the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the embodiment of the invention timely modifies the state of the terminal to be recovered after stolen, and the server also does not need to waste a resource such as a space, etc. to query and store related information of the terminal. Further, the current state of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

Preferably, after modifying the state information of the terminal to be the current state, the embodiment of the invention returns the modification result to the sending party of the state modification message. In the embodiment of the invention, after modifying the current state of the terminal, the modification result is sent to the sending party to remind the sending party that the current state of the terminal has been modified, and in turn enable the sending party to perform a corresponding operation according to the modified current state of the terminal. For example, when the terminal is a mobile phone, the user uses a relative's/friend's number bound to the stolen mobile phone to send a state modification message to the stolen mobile phone to mark the mobile phone to be stolen. After the server modifies the current state of the mobile phone to be stolen according to the state modification message, if the modification result is returned to the relative's/friend's number, the user can know that the mobile phone has been marked to be stolen in time, and further perform other anti-theft operations on the stolen mobile phone.

In the embodiment of the invention, the identity identification information of the terminal may be the IMEI of the terminal, may be the ID of the terminal, or also may be any identity identification information which can uniquely identify the terminal, which will not be defined by the embodiment of the invention.

To increase the security of the terminal and determine that the received state modification message is a legal state modification message, preferably, the embodiment of the invention provides a terminal identity identification. The terminal identity identification is a hardware ID of the terminal. Since the obtaining of the hardware ID comprises a comprehensive operation of the IMEI of the terminal, the network card address of the terminal and the serial number of the CPU of the terminal, the hardware ID is a comprehensive identity identification of the terminal. Legality verification is performed on the state modification message by taking the hardware ID as the identity identification of the terminal, and if the state modification message passes the verification, then it shows that the IMEI of the terminal, the network card address of the terminal and the serial number of the CPU of the terminal carried in the state modification message all pass the verification, which has higher assurance for the legality of the state modification message. Therein, a method for calculating the hardware ID is referred to Embodiment One.

In addition, in the embodiment of the invention, the sending party of the state modification message may be disposed in a mobile terminal, for example, a mobile phone, a notebook computer, etc., and send the state modification message in the form of short message or network. The sending party in the embodiment of the invention may be further disposed in a terminal, e.g., a computer, and send the state modification message in the form of network. By employing the embodiment of the invention, the state information of the terminal can be modified in time. For example, after the terminal is stolen, the user can send a state modification message via various message sending platforms, which ensures that the terminal is marked to be stolen in time, and can further know related information of the stolen terminal in time, which increases the probability of recovering the stolen terminal.

Now, the method for processing a stolen terminal of the invention will be further described in a specific embodiment.

Figure 11:
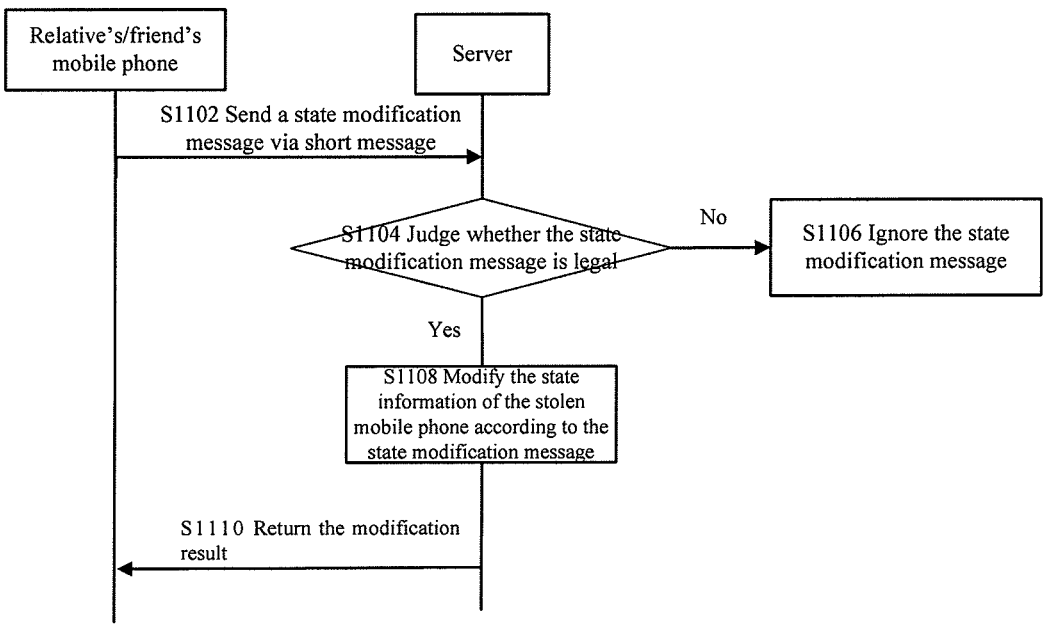
FIG. 11 shows a processing flow chart of a method for processing a stolen terminal according to still another embodiment of the invention.

FIG. 11 shows a processing flow chart of a method for processing a stolen terminal according to a preferred embodiment of the invention, which supports any of the methods for processing a stolen terminal, and elaborates the above method for processing a stolen terminal more clearly and understandably. With reference to FIG. 11, the flow comprises at least step S1102 to step S1110.

It needs to be noted that, to elaborate the preferred embodiment more simply and clearly, in the preferred embodiment, the sending party of the state modification message is set in a relative's/friend's mobile phone, and the terminal is set to be a stolen mobile phone, wherein the relative's/friend's mobile phone is a mobile phone where a relative's/friend's number bound to the stolen mobile phone is located.

At the step S1102, a state modification message is sent to mark a mobile phone to be stolen.

In particular, after finding that the mobile phone is stolen, a user can send a state modification message to a server via a mobile phone with a relative's/friend's number bound to the stolen mobile phone in advance. When using the relative's/friend's mobile phone, the preferred embodiment can send the state modification message to the server via short message, and the state modification message sent to the server carries the identity identification information of the stolen mobile phone.

At the step S1104, it is judged whether the state modification message is legal.

After receiving the state modification message, the server performs legality verification on the state modification message. If the identity identification information carried in the state modification message cannot match identity identification information stored locally in the server, the server judges that the state modification message cannot pass the legality verification, and performs the step S1106. If the identity identification information carried in the state modification message can match identity identification information stored locally in the server, the server judges that the state modification message passes the legality verification, and performs the step S1108.

At the step S1106, the state modification message does not pass the legality verification, and the server ignores the state modification message.

At the step S1108, the state modification message passes the legality verification, and the server modifies the state information of the stolen mobile phone according to the state modification message.

After the server judges that the state modification message passes the verification, the server modifies the state information of the stolen mobile phone to be that the mobile phone is stolen according to the state modification message.

At the step S1110, the modification result is returned.

After modifying the state information of the stolen mobile phone, the server sends the modification result to the sending party of the state modification message, i.e., the relative's/friend's mobile phone or a personal computer in the preferred embodiment, via short message. After receiving the modification result returned by the server, the sending party of the state modification message determines that the mobile phone is successfully marked to be stolen.

Figure 12:
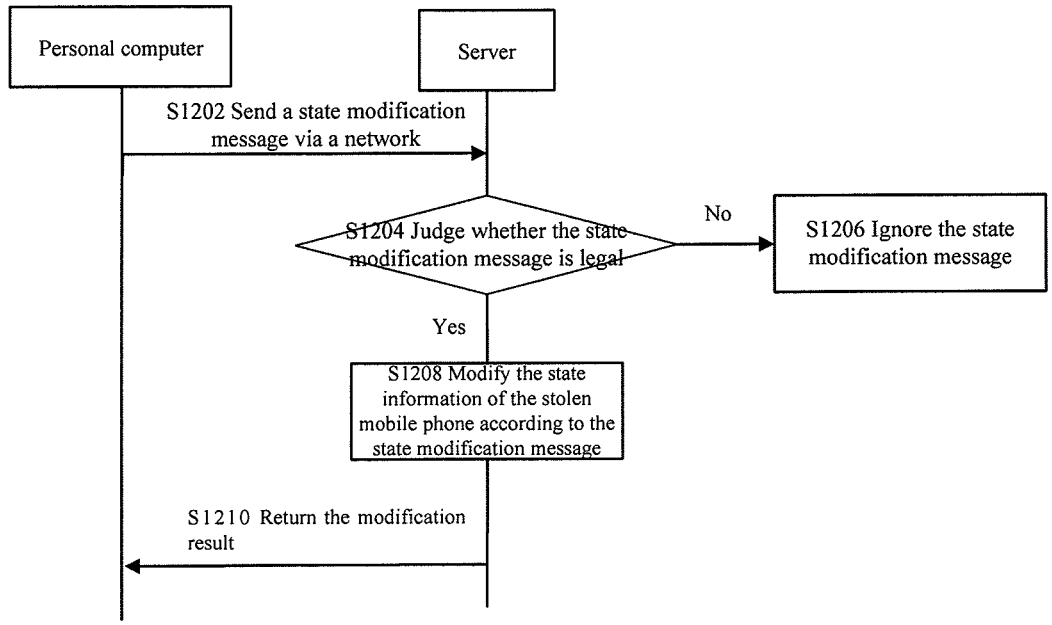
FIG. 12 shows a processing flow chart of a method for processing a stolen terminal according to still another preferred embodiment of the invention.

FIG. 12 shows a processing flow chart of a method for processing a stolen terminal according to another preferred embodiment of the invention, which is used for supporting any of the methods for processing a stolen terminal, and elaborating the above method for processing a stolen terminal more clearly and understandably. With reference to FIG. 12, the flow comprises at least step S1202 to step S1210.

It needs to be noted that, to elaborate the preferred embodiment more simply and clearly, in the preferred embodiment, the sending party of the state modification message is set in a personal computer, and the terminal is set to be a stolen terminal.

At the step S1202, a state modification message is sent to mark a mobile phone to be stolen.

In particular, after finding that the mobile phone is stolen, a user can send a state modification message to a server via a personal computer. When using the personal computer, the preferred embodiment can send the state modification message to the server via a network, and the state modification message sent to the server carries the identity identification information of the stolen mobile phone.

At the step S1204, it is judged whether the state modification message is legal.

After receiving the state modification message, the server performs legality verification on the state modification message. If the identity identification information carried in the state modification message cannot match identity identification information stored locally in the server, the server judges that the state modification message cannot pass the legality verification, and performs the step S1206. If the identity identification information carried in the state modification message can match identity identification information stored locally in the server, the server judges that the state modification message passes the legality verification, and performs the step S1208.

At the step S1206, the state modification message does not pass the legality verification, and the server ignores the state modification message.

At the step S1208, the state modification message passes the legality verification, and the server modifies the state information of the stolen mobile phone according to the state modification message.

After the server judges that the state modification message passes the verification, the server modifies the state information of the stolen mobile phone to be that the mobile phone is stolen according to the state modification message.

At the step S1210, the modification result is returned.

After modifying the state information of the stolen mobile phone, the server sends the modification result to the sending party of the state modification message, i.e., a relative's/friend's mobile phone or the personal computer in the preferred embodiment, via a network. After receiving the modification result returned by the server, the sending party of the state modification message determines that the mobile phone is successfully marked to be stolen.

Figure 13:
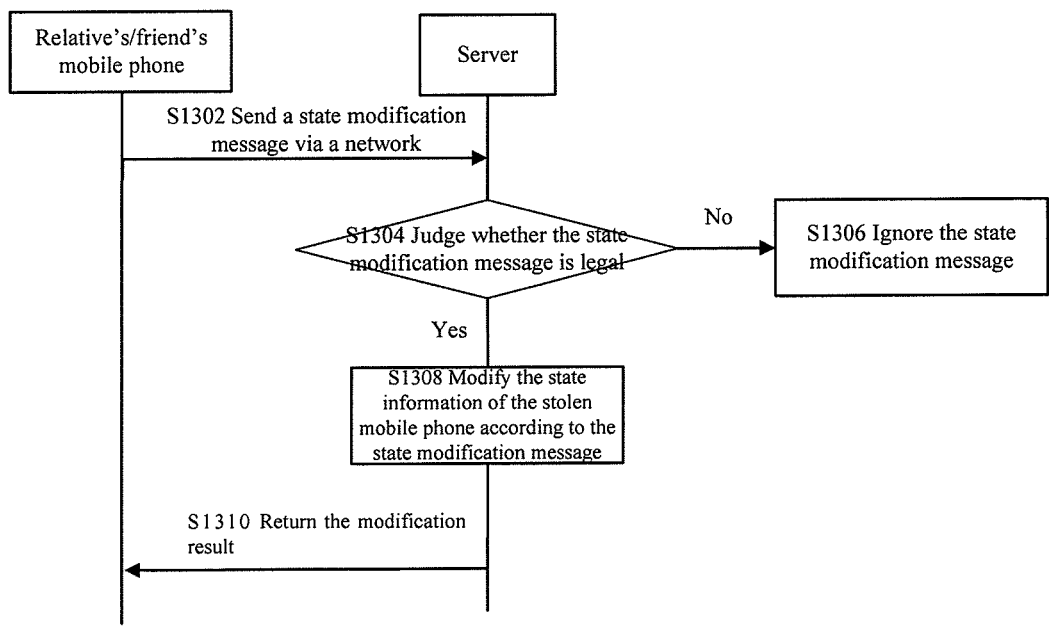
FIG. 13 shows a processing flow chart of a method for processing a stolen terminal according to still another preferred embodiment of the invention.

FIG. 13 shows a processing flow chart of a method for processing a stolen terminal according to still another preferred embodiment of the invention, which supports any of the methods for processing a stolen terminal, and elaborates the above method for processing a stolen terminal more clearly and understandably. With reference to FIG. 13, the flow comprises at least step S1302 to step S1310.

It needs to be noted that, to elaborate the preferred embodiment more simply and clearly, in the preferred embodiment, the sending party of the state modification message is set in a relative's/friend's mobile phone, and the terminal is set to be a stolen mobile phone, wherein the relative's/friend's mobile phone is a mobile phone where a relative's/friend's number bound to the stolen mobile phone is located.

At the step S1302, a state modification message is sent to mark a mobile phone to be stolen.

In particular, after finding that the mobile phone is stolen, a user can send a state modification message to a server via a mobile phone with a relative's/friend's number bound to the stolen mobile phone in advance. When using the relative's/friend's mobile phone, the preferred embodiment can send the state modification message to the server via a network, and the state modification message sent to the server carries the identity identification information of the stolen mobile phone.

At the step S1304, it is judged whether the state modification message is legal.

After receiving the state modification message, the server performs legality verification on the state modification message. If the identity identification information carried in the state modification message cannot match identity identification information stored locally in the server, the server judges that the state modification message cannot pass the legality verification, and performs the step S1306. If the identity identification information carried in the state modification message can match identity identification information stored locally in the server, the server judges that the state modification message passes the legality verification, and performs the step S1308.

At the step S1306, the state modification message does not pass the legality verification, and the server ignores the state modification message.

At the step S1308, the state modification message passes the legality verification, and the server modifies the state information of the stolen mobile phone according to the state modification message.

After the server judges that the state modification message passes the verification, the server modifies the state information of the stolen mobile phone to be that the mobile phone is stolen according to the state modification message.

At the step S1310, the modification result is returned.

After modifying the state information of the stolen mobile phone, the server sends the modification result to the sending party of the state modification message, i.e., the relative's/friend's mobile phone or a personal computer in the preferred embodiment, via a network. After receiving the modification result returned by the server, the sending party of the state modification message determines that the mobile phone is successfully marked to be stolen.

Based on the methods for processing a stolen terminal provided in the above individual preferred embodiments and based on the same inventive concept, an embodiment of the invention provides a server, which is used for implementing a method for processing a stolen terminal as described above.

Figure 14:
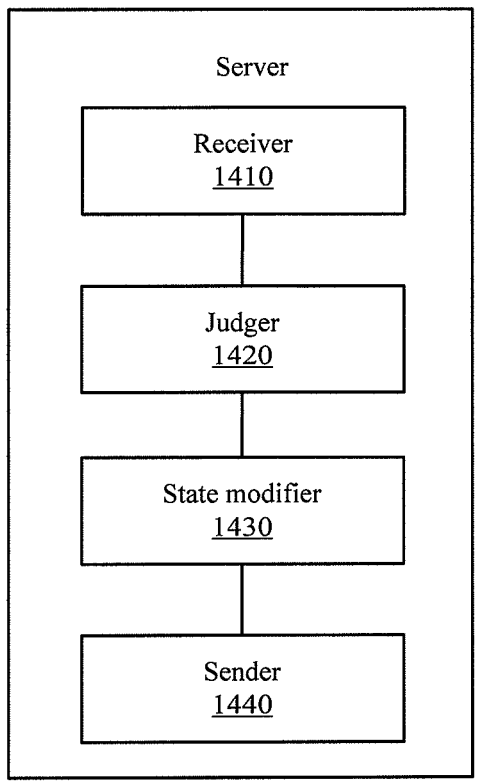
FIG. 14 shows a structural schematic diagram of a server according to still another embodiment of the invention.

FIG. 14 shows a structural schematic diagram of a server according to an embodiment of the invention. With reference to FIG. 14, the server of the embodiment of the invention comprises at least: a receiver 1410, a judger 1420 and a state modifier 1430.

Now, functions of individual devices or components and a connection relationship between individual parts of the server of the embodiment of the invention will be introduced.

The receiver 1410 is configured to receive a state modification message from a sending party, wherein the state modification message carries identity identification information of a terminal and the current state of the terminal.

The judger 1420 is coupled to the receiver 1410 and configured to judge whether the state modification message passes legality verification.

The state modifier 1430 is coupled to the judger 1420 and configured to modify the state information of a terminal corresponding to the identity identification information to be the current state according to the state modification message which passes the legality verification.

The embodiment of the invention receives a state modification message from a sending party, and verifies the state modification message, which guarantees that the received state modification message is an authentic, valid and credible message, and avoids that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal cannot be obtained, and the theft cannot be captured according to the related information of the stolen terminal. After the state modification message passes the legality verification, the embodiment of the invention modifies the state information of the terminal according to the state modification message, which solves the problem in the prior art that other identification cannot be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

In the server as shown in FIG. 14, the receiver 1410 receives a state modification message from a sending party, wherein the state modification message carries the identity identification of a terminal of which the state information has been changed. After the receiver 1410 receives the state modification message from the sending party, to guarantee that the received state modification message is authentic, valid and credible, and avoid that a server modifies the state information of a terminal erroneously due to reception of a state modification message sent from an incredible or malicious sending side, the receiver 1410 triggers the judger 1420. After the judger 1420 is triggered, it judges whether the state modification message can pass legality verification. In particular, if the identity identification information of the terminal carried in the state modification message can match the identity identification information of a terminal stored locally in the server, the judger 1420 judges that the state modification message passes the legality verification. If the identity identification information of the terminal carried in the state modification message can not match the identity identification information of a terminal stored locally in the server, the judger 1420 judges that the state modification message does not pass the legality verification.

After the judger 1420 verifies the state modification message received by the receiver 1410, if the state modification message does not pass the verification, the server cannot guarantee that the state modification message received by the server is authentic, valid and credible, and cannot guarantee that the sending party of the state modification message is not an incredible or malicious sending side. Therefore, when the judger 1420 judges that the state verification information is illegal, to guarantee that the server will not modify the state information of the terminal erroneously according to a state modification message from an incredible party, the server ignores the received state modification message, and does not perform any operation. If the judger 1420 judges that the state modification message is legal, then the state modifier 1430 coupled to the judger 1420 is triggered. After triggered, the state modifier determines a corresponding terminal according to the identity identification information of the terminal carried in the state modification message. After the terminal is determined, the state modifier 1420 modifies the state information of the terminal stored locally in the server to guarantee that the state information of the terminal is updated in time.

In the embodiment of the invention, the current state of the terminal may comprise that the terminal is stolen, the terminal is not stolen, and the terminal is recovered after stolen, and the like. After the terminal is stolen, the state modifier 1420 modifies the state information of the terminal in time, so that after the server receives related information of the terminal (e.g., the real-time location of the terminal, the fingerprints of the user who uses the terminal currently, etc.), it can provide the loser with a related clue of the stolen terminal, and increase the possibility of recovering the terminal by the loser. After the terminal is recovered after stolen, the state modifier 1420 in the server timely modifies the state of the terminal to be recovered after stolen, and the server also does not need to waste a resource such as a space, etc. to query and store related information of the terminal. Further, the current state of the terminal of the embodiment of the invention may further comprise a more detailed description, for example, comprise the sell/buy state information of the terminal such as that the terminal is not sold, the terminal is in use, and the terminal is resold, and the like, or also may be any other current state information of the terminal, which will not be defined by the embodiment of the invention.

Preferably, after modifying the state information of the terminal to be the current state, the state modifier 1420 triggers a sender 1440. The sender 1440 returns the modification result to the sending party of the state modification message. In the embodiment of the invention, after modifying the current state of the terminal, the sender 1440 sends the modification result to the sending party to remind the sending party that the current state of the terminal has been modified, and in turn enable the sending party to perform a corresponding operation according to the modified current state of the terminal. For example, when the terminal is a mobile phone, the user uses a relative's/friend's number bound to the stolen mobile phone to send a state modification message to the stolen mobile phone to mark the mobile phone to be stolen. After the server modifies the current state of the mobile phone to be stolen according to the state modification message, if the modification result is returned to the relative's/friend's number, the user can know that the mobile phone has been marked to be stolen in time, and further perform other anti-theft operations on the stolen mobile phone.

In the embodiment of the invention, the identity identification information of the terminal may be the IMEI of the terminal, may be the user ID of the terminal, or also may be any identity identification information which can uniquely identify the terminal, which will not be defined by the embodiment of the invention.

To increase the security of the terminal and determine that the received state modification message is a legal state modification message, preferably, the embodiment of the invention provides a terminal identity identification. The terminal identity identification is a hardware ID of the terminal. Since the obtaining of the hardware ID comprises a comprehensive operation of the IMEI of the terminal, the network card address of the terminal and the serial number of the CPU of the terminal, the hardware ID is a comprehensive identity identification of the terminal. Legality verification is performed on the state modification message by taking the hardware ID as the identity identification of the terminal, and if the state modification message passes the verification, then it shows that the IMEI of the terminal, the network card address of the terminal and the serial number of the CPU of the terminal carried in the state modification message all pass the verification, which has higher assurance for the legality of the state modification message. Therein, a method for calculating the hardware ID is referred to Embodiment One.

In addition, in the embodiment of the invention, the sending party of the state modification message may be disposed in a mobile terminal, for example, a mobile phone, a notebook computer, etc., and send the state modification message in the form of short message or network. The sending party in the embodiment of the invention may be further disposed in a terminal, e.g., a computer, and send the state modification message in the form of network. By employing the embodiment of the invention, the state information of the terminal can be modified in time. For example, after the terminal is stolen, the user can send a state modification message via various message sending platforms, which ensures that the terminal is marked to be stolen in time, and can further know related information of the stolen terminal in time, which increases the probability of recovering the stolen terminal.

In the embodiment, the server (see FIG. 14) receives a state modification message from a sending party, performs identity verification on it, and modifies it when it passes the verification. That is, in the embodiment of the invention, the functions of the server is for verifying a state modification message, and after it passes the verification, modifying the state information of a terminal stored locally according to a corresponding request.

According to any one of the preferred embodiments or a combination of multiple preferred embodiments, embodiments of the invention can achieve the following beneficial effects:

after receiving a state modification message from a sending party, the embodiment of the invention verifies the state modification message to guarantee that the received state modification message is an authentic, valid and credible message, and avoid that the state information of a terminal is maliciously modified due to reception of a state modification message sent from an incredible or malicious sending party. If the state information of the terminal is maliciously modified, it may result in that the server feeds the real-time location of a user of the terminal back to the malicious sending party and information of the user is leaked to the malicious sending party, or may result in that a stolen terminal is relieved of the stolen identification, in turn, the related information of the stolen terminal can not be obtained, and the theft can not be captured according to the related information of the stolen terminal. After the state modification message passes legality verification, the embodiment of the invention modifies the state information of the terminal according to the state modification message, which solves the problem in the prior art that other identification can not be provided to indicate whether the terminal is stolen or not. By employing the method for processing a stolen terminal provided by the embodiment of the invention, the state information of the stolen terminal can be changed. For example, after a terminal is stolen, the current state of the terminal can be changed to be stolen by employing the embodiment of the invention. If the theft conducts a transaction on the stolen terminal, the buyer can query out that the terminal is stolen, and in turn, stop the transaction and provide a clue of the theft. Therefore, by employing the embodiment of the invention, the beneficial effects of increasing the probability of recovering a stolen terminal and effectively curbing the stealing acts can be achieved.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in multiple devices according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 15:
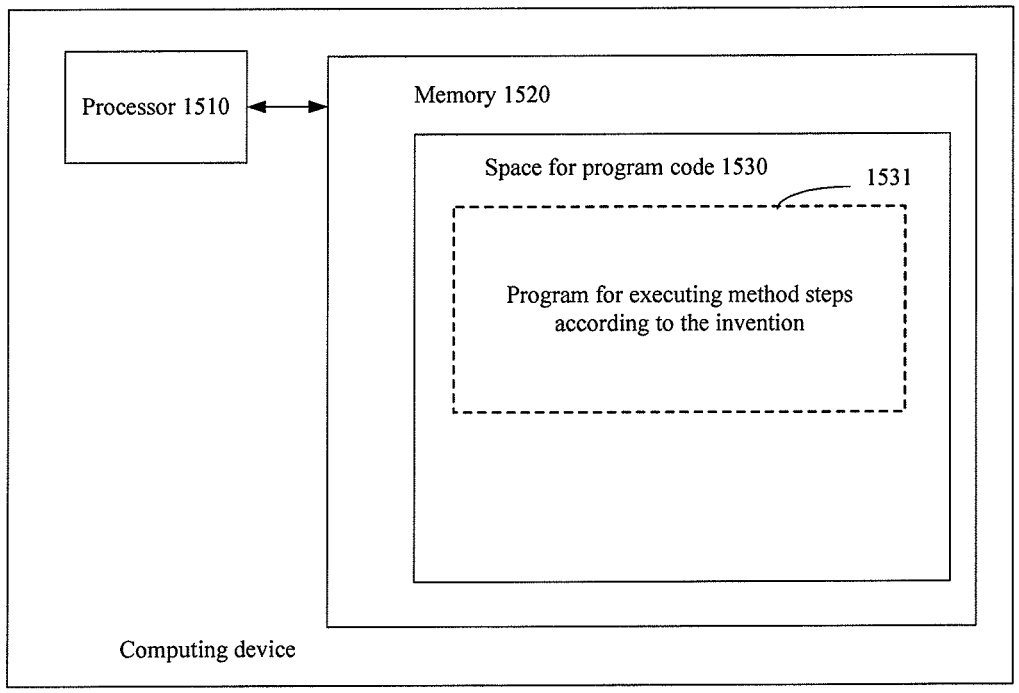
FIG. 15 shows schematically a block diagram of a computing device for performing a method for processing a stolen terminal according to the invention.
Figure 16:
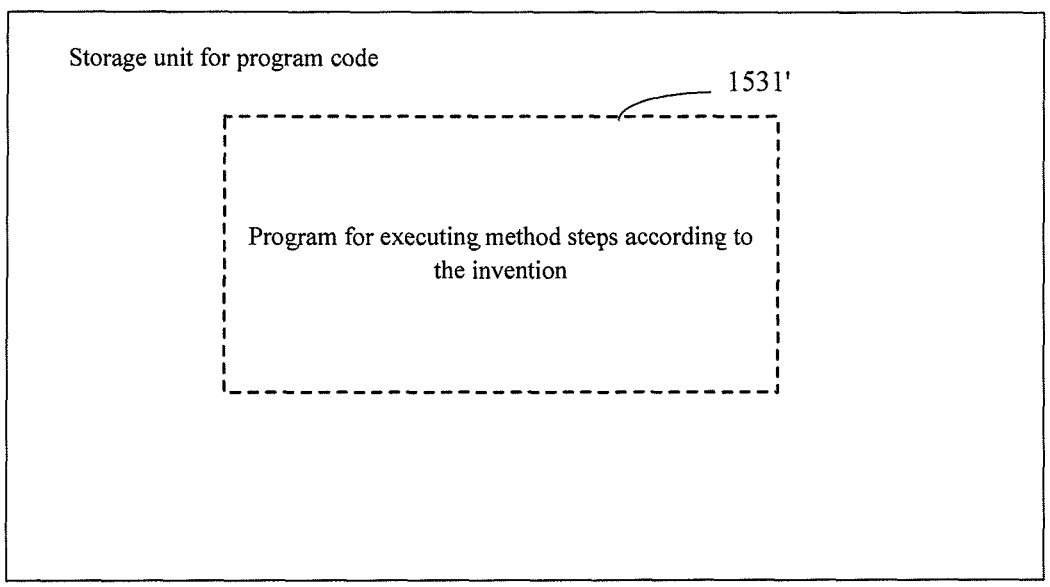
FIG. 16 shows schematically a storage unit for retaining or carrying a program code implementing a method for processing a stolen terminal according to the invention.

For example, FIG. 15 shows a computing device which may carry out a method for processing a stolen terminal according to the invention. The computing device traditionally comprises a processor 1510 and a computer program product or a computer readable medium in the form of a memory 1520. The memory 1520 may be an electronic memory such as a flash memory, an EEPROM (electrically erasable programmable read-only memory), an EPROM, a hard disk or a ROM. The memory 1520 has a memory space 1530 for a program code 1531 for carrying out any method steps in the methods as described above. For example, the memory space 1530 for a program code may comprise individual program codes 1531 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 16. The storage unit may have a memory segment, a memory space, etc. arranged similarly to the memory 1520 in the computing device of FIG. 15. The program code may for example be compressed in an appropriate form. In general, the storage unit comprises a computer readable code 1531', i.e., a code which may be read by e.g., a processor such as 1510, and when run by a computing device, the codes cause the computing device to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for processing a stolen terminal, comprising:
   receiving a state modification message from a sending party, wherein the state modification message carries a current state of the terminal; and
   when the state modification message is legal, obtaining identity identification information of the terminal, and forwarding the state modification message carrying the identity identification information to a server, so that the server modifies a state information of the terminal stored in the server to be the current state according to the state modification message carrying the identity identification information, wherein the identity identification information comprises a hardware identification (ID) of the terminal, and the hardware ID is calculated according to the following steps:
   obtaining an international mobile equipment identity (IMEI) of the terminal, which is denoted as a first character string;
   obtaining a network card address of the terminal, wherein a character string left after non-letter and non-numeric characters in the network card address are removed is denoted as a second character string;
   obtaining a serial number of a central processing unit (CPU) of the terminal, which is denoted as a third character string;
   merging the first character string, the second character string and the third character string according to a predetermined order, and converting the merged character string into a capital format, which is denoted as a first result;
   performing a Message Digest Algorithm (MD5) calculation on the first result, to obtain a second result; and
   converting the second result into a capital format to obtain the hardware ID.

2. The method as claimed in claim 1, wherein after forwarding the state modification message to a server, further comprising:
   receiving a modification result of the state information of the terminal returned by the server; and
   sending the modification result to the sending party.

3. The method as claimed in claim 1, further comprising:
   judging whether the state modification message is legal or not according to the following steps comprising:
   judging whether the sending party matches a credible number stored in the terminal;
   the state modification message being illegal if the sending party does not match a credible number stored in the terminal; and ignoring the state modification message;
   the state modification message being legal if the sending party matches a credible number stored in the terminal; and obtaining the identity identification information of the terminal, and forwarding the state modification message carrying the identity identification information to the server.

4. The method as claimed in claim 3, wherein after forwarding the state modification message carrying the identity identification information to the server, the method further comprises:
utilizing the server to judge whether the identity identification information carried in the state modification message matches identity identification information stored in the server;
ignoring the state modification message if the identity identification information carried in the state modification message does not match identity identification information stored in the server; and
triggering the operation of modifying the state information in the server if the identity identification information carried in the state modification message matches identity identification information stored in the server.

5. The method as claimed in claim 3, wherein the identity identification information further comprises at least one of the following:
the international mobile equipment identity (IMEI) of the terminal; and
a user identity identification (ID) of the terminal.

6. The method as claimed in claim 1, wherein the sending party is disposed in a mobile terminal.

7. A method for processing a stolen terminal, comprising:
receiving a state modification message from a sending party, wherein the state modification message carries identity identification information of a terminal of which a state has been changed;
forwarding the state modification message to a terminal corresponding to the identity identification information of the terminal for verification by the terminal; and
modifying a state information of the terminal according to a state modification request carrying a hardware identification (ID) of the terminal returned when the terminal verifies that the state modification message passes, wherein the hardware ID is calculated according to the following steps:
obtaining an international mobile equipment identity (IMEI) of the terminal, which is denoted as a first character string;
obtaining a network card address of the terminal, wherein a character string left after non-letter and non-numeric characters in the network card address are removed is denoted as a second character string;
obtaining a serial number of a central processing unit (CPU) of the terminal, which is denoted as a third character string;
merging the first character string, the second character string and the third character string according to a predetermined order, and converting the merged character string into a capital format, which is denoted as a first result;
performing a Message Digest Algorithm (MD5) calculation on the first result, to obtain a second result; and
converting the second result into a capital format to obtain the hardware ID.

8. The method as claimed in claim 7, wherein after receiving the state modification message from the sending party, the method further comprises:
judging whether the identity identification information of the terminal carried in the state modification message matches identity identification information stored locally in a server; and
determining whether forwarding the state modification message to the terminal according to the matching result.

9. The method as claimed in claim 8, wherein the determining whether forwarding the state modification message to the terminal according to the matching result comprises:
ignoring the state modification message if the identity identification information of the terminal carried in the state modification message does not match identity identification information stored locally in the server; and
forwarding the state modification message to the terminal if the identity identification information of the terminal carried in the state modification message matches identity identification information stored locally in the server.

10. The method as claimed in claim 7, wherein after modifying the state information of the terminal, the method further comprises:
returning the implementation of modifying the state information of the terminal to the sending party.

11. The method as claimed in claim 10, wherein the returning the implementation of modifying the state information of the terminal to the sending party further comprises:
sending a task identification (ID) for performing the operation of modifying the state information of the terminal to the sending party;
receiving a query request sent by the sending party for querying about the implementation of the modification operation, wherein the query request carries the task ID; and
returning the implementation of modifying the state information of the terminal to the sending party.

12. The method as claimed in claim 7, wherein the state modification message is verified according to the following steps comprising:
utilizing the terminal to judge whether the identity identification information of the terminal carried in the state modification message matches identity identification information stored in the terminal; and
if yes, the state modification message being legal; and ignoring the state modification message;
if no, the state modification message being illegal; and obtaining the hardware ID of the terminal, and sending the state modification request carrying the hardware ID to the server.

13. The method as claimed in claim 7, wherein after the state modification request is returned when the terminal verifies that the state modification message passes, the method further comprises:
judging whether the hardware ID carried in the state modification request matches a hardware ID stored in the server;
ignoring the state modification request if the hardware ID does not match a hardware ID stored in the server; and
triggering the operation of modifying the state information of the terminal by the server if the hardware ID matches a hardware ID stored in the server.

14. The method as claimed in claim 7, wherein
the sending party is disposed in a mobile terminal, and sends the state modification message in the form of short message or network; or the sending party is disposed in a terminal, and sends the state modification message in the form of a network.

15. A method for processing a stolen terminal, comprising:

receiving a state modification message from a sending party, wherein the state modification message carries identity identification information of a terminal and a current state of the terminal;

utilizing a server to perform legality verification on the state modification message; and modifying a state information of a terminal corresponding to the identity identification information to be the current state according to the state modification message which passes the legality verification, wherein the identity identification information comprises a hardware identification (ID) of the terminal, and the hardware ID is calculated according to the following steps:

obtaining an international mobile equipment identity (IMEI) of the terminal, which is denoted as a first character string;

obtaining a network card address of the terminal, wherein a character string left after non-letter and non-numeric characters in the network card address are removed is denoted as a second character string;

obtaining a serial number of a central processing unit (CPU) of the terminal, which is denoted as a third character string;

merging the first character string, the second character string and the third character string according to a predetermined order, and converting the merged character string into a capital format, which is denoted as a first result;

performing a Message Digest Algorithm (MD5) calculation on the first result, to obtain a second result; and converting the second result into a capital format to obtain the hardware ID.

16. The method as claimed in claim 15, wherein after modifying the state information of the terminal corresponding to the identity identification information to be the current state, the method further comprises:

returning a modification result of modifying the state information of the terminal to the sending party.

17. The method as claimed in claim 15, wherein the utilizing a server to perform legality verification on the state modification message comprises:

utilizing the server to verify whether the state modification message is legal according to whether the identity identification information carried in the state modification message matches identity identification information stored locally in the server;

the state modification message being illegal if the identity identification information carried in the state modification message does not match identity identification information stored locally in the server; and ignoring the state modification message;

the state modification message being legal if the identity identification information carried in the state modification message matches identity identification information stored locally in the server; and triggering the operation of modifying the state information.

18. The method as claimed in claim 15, wherein the identity identification information of the terminal further comprises at least one of the following:

the international mobile equipment identity (IMEI) of the terminal; and the user identity identification (ID) of the terminal.

* * * * *